US010793692B2

(12) United States Patent
Barksby et al.

(10) Patent No.: US 10,793,692 B2
(45) Date of Patent: Oct. 6, 2020

(54) VISCOELASTIC FLEXIBLE FOAMS COMPRISING HYDROXYL-TERMINATED PREPOLYMERS

(71) Applicant: COVESTRO LLC, Pittsburgh, PA (US)

(72) Inventors: Nigel Barksby, Moon Township, PA (US); Brian L. Neal, Pittsburgh, PA (US)

(73) Assignee: Covestro LLC, Pittsburgh, PA (US)

( * ) Notice: Subject to any disclaimer, the term of this patent is extended or adjusted under 35 U.S.C. 154(b) by 141 days.

(21) Appl. No.: 16/169,323

(22) Filed: Oct. 24, 2018

(65) Prior Publication Data
US 2020/0131327 A1  Apr. 30, 2020

(51) Int. Cl.
C08J 9/02 (2006.01)
C08G 18/48 (2006.01)
C08J 9/00 (2006.01)
C08J 9/14 (2006.01)
C08G 101/00 (2006.01)

(52) U.S. Cl.
CPC ............ *C08J 9/02* (2013.01); *C08G 18/4833* (2013.01); *C08J 9/0061* (2013.01); *C08J 9/142* (2013.01); *C08G 2101/0008* (2013.01); *C08J 2371/02* (2013.01); *C08J 2375/08* (2013.01)

(58) Field of Classification Search
CPC .... C08G 18/10; C08G 18/242; C08G 18/283; C08G 18/36; C08G 18/4812; C08G 18/482; C08G 18/4825; C08G 18/4829; C08G 18/4833; C08G 18/4837; C08G 18/5045; C08G 18/7621; C08G 18/7664; C08G 2101/0008; C08G 2101/0058; C08G 2101/0083; C08J 9/0061; C08J 9/02; C08J 9/142; C08J 2371/02; C08J 2375/08
See application file for complete search history.

(56) References Cited

U.S. PATENT DOCUMENTS

| 3,405,077 | A | 10/1968 | Pastor et al. |
| 3,433,752 | A | 3/1969 | Zagoren et al. |
| 3,454,504 | A | 7/1969 | Murai et al. |
| 3,875,086 | A | 4/1975 | Ramey et al. |
| 4,209,593 | A | 6/1980 | Khanna |
| 4,438,001 | A | 3/1984 | Suzuki et al. |
| 4,656,196 | A | 4/1987 | Kelly et al. |
| 4,670,477 | A | 6/1987 | Kelly et al. |
| 4,950,694 | A | 8/1990 | Hager |
| 4,950,695 | A | 8/1990 | Stone |
| 4,950,965 | A | 8/1990 | Kenny et al. |
| 4,981,880 | A | 1/1991 | Lehmann et al. |
| 5,114,619 | A | 5/1992 | Heuvelsland |
| 5,539,011 | A | 7/1996 | Hilker et al. |
| 5,631,319 | A | 5/1997 | Reese et al. |
| 5,670,601 | A | 9/1997 | Allen et al. |
| 5,689,012 | A | 11/1997 | Pazos et al. |
| 5,777,177 | A | 7/1998 | Pazos |
| 5,919,988 | A | 7/1999 | Pazos et al. |
| 6,034,145 | A | 3/2000 | Cornet et al. |
| 6,034,197 | A | 3/2000 | Mahon et al. |
| 6,063,309 | A | 5/2000 | Hager et al. |
| 6,066,683 | A | 5/2000 | Beisner et al. |
| 6,136,879 | A | 10/2000 | Nishida et al. |
| 6,218,444 | B1 | 4/2001 | Hager et al. |
| 6,391,820 | B1 | 5/2002 | Ooms et al. |
| 6,391,933 | B1 | 5/2002 | Mattesky |
| 6,391,935 | B1 | 5/2002 | Hager et al. |
| 6,491,846 | B1 | 12/2002 | Reese, II et al. |
| 6,521,674 | B1 | 2/2003 | Haley et al. |
| 6,638,986 | B2 | 10/2003 | Falke et al. |
| 6,762,214 | B1 | 7/2004 | Tracy et al. |
| 6,838,516 | B2 | 1/2005 | Dai et al. |
| 6,884,825 | B2 * | 4/2005 | Daunch ............... C08G 18/409 521/130 |
| 7,051,389 | B2 | 5/2006 | Wassilefky |
| 7,078,443 | B2 | 7/2006 | Milliren |
| 7,415,742 | B2 | 8/2008 | Wassilefsky |
| 7,469,437 | B2 | 12/2008 | Mikkelsen et al. |
| 7,530,127 | B2 | 5/2009 | Leifermann et al. |
| 7,735,169 | B2 | 6/2010 | Wassilefsky |
| 7,754,809 | B2 | 7/2010 | Stollmaier et al. |
| 7,968,754 | B2 | 6/2011 | Ostrowski et al. |
| 8,232,364 | B2 | 7/2012 | Hoffman et al. |
| 8,242,184 | B2 | 8/2012 | Sasaki et al. |
| 8,268,906 | B2 | 9/2012 | Sasaki et al. |
| 8,318,823 | B2 * | 11/2012 | Triouleyre ......... C08G 18/4072 521/137 |
| 8,418,297 | B2 | 4/2013 | Mikkelsen et al. |
| 8,487,015 | B2 | 7/2013 | Sasaki et al. |
| 8,541,479 | B2 | 9/2013 | Sasaki et al. |
| 8,656,537 | B2 | 2/2014 | Leifermann et al. |
| 8,975,306 | B2 | 3/2015 | Milliren |
| 8,975,335 | B2 | 3/2015 | Hager et al. |
| 9,029,432 | B2 | 5/2015 | Aou et al. |
| 9,062,174 | B2 | 6/2015 | Smiecinski |
| 9,133,298 | B2 | 9/2015 | Hager et al. |
| 9,255,174 | B2 | 2/2016 | Aou et al. |
| 9,266,996 | B2 | 2/2016 | Obi et al. |
| 9,376,526 | B2 | 6/2016 | Hager et al. |

(Continued)

FOREIGN PATENT DOCUMENTS

JP  2000290344 A  10/2000

*Primary Examiner* — John M Cooney

(74) *Attorney, Agent, or Firm* — N. Denise Brown

(57) ABSTRACT

This invention relates to a process for preparing viscoelastic flexible polyurethane foam comprising reacting an isocyanate component with an isocyanate-reactive component that comprises a polyol blend having a hydroxyl number of 56 to 250 and an average functionality of greater than 2, and a hydroxyl-terminated prepolymer. The invention also relates to viscoelastic flexible polyurethane foams.

26 Claims, No Drawings

(56) References Cited

U.S. PATENT DOCUMENTS

| | | | |
|---|---|---|---|
| 2003/0045595 A1* | 3/2003 | Toyota | C08G 18/4866 |
| | | | 521/155 |
| 2004/0019160 A1 | 1/2004 | Dai et al. | |
| 2007/0232711 A1* | 10/2007 | Frei | C08G 18/7621 |
| | | | 521/128 |
| 2007/0299153 A1 | 12/2007 | Hager et al. | |
| 2008/0139685 A1 | 6/2008 | Reese et al. | |
| 2009/0062416 A1 | 3/2009 | Sasaki et al. | |
| 2009/0215918 A1 | 8/2009 | Sasaki et al. | |
| 2010/0096768 A1* | 4/2010 | Sasaki | C08G 18/632 |
| | | | 264/54 |
| 2010/0168262 A1 | 7/2010 | Sasaki et al. | |
| 2011/0237760 A1* | 9/2011 | Schumann | C08G 18/6674 |
| | | | 525/453 |
| 2012/0202908 A1 | 8/2012 | Sasaki et al. | |
| 2013/0030068 A1* | 1/2013 | Sasaki | C08G 18/4837 |
| | | | 521/126 |
| 2013/0035413 A1 | 2/2013 | Obi et al. | |
| 2013/0289150 A1 | 10/2013 | Hager et al. | |
| 2015/0077640 A1 | 3/2015 | Kanda | |
| 2015/0166713 A1 | 6/2015 | Franceschin et al. | |
| 2016/0250786 A1* | 9/2016 | Murata | B29C 44/355 |
| | | | 264/46.4 |
| 2016/0340464 A1 | 11/2016 | McVey et al. | |

\* cited by examiner

VISCOELASTIC FLEXIBLE FOAMS COMPRISING HYDROXYL-TERMINATED PREPOLYMERS

FIELD

The invention relates to novel viscoelastic flexible polyurethane foams and to a process for preparing these viscoelastic polyurethane foams. The viscoelastic flexible foams which comprise a hydroxyl-terminated prepolymer exhibit improved 90% compression sets and IFD values at 25%. In addition, these foams preferably maintain a low $T_g$ as measured by tan delta and a ratio of the storage modulus at 15° C. to the storage modulus 30° C. of less than or equal to 5.

BACKGROUND

The popularity of viscoelastic polyurethane foam, also referred to as memory foam or low resilience foam, has significantly increased in recent years as pillows, toppers or layers in mattresses and bed in a box foams. It is also used in other home and office furnishings as well as automotive applications. This increased use has created a demand for higher quality viscoelastic foams with high air flows and improved physical properties such as reduced compression sets and better tear strength. A common consumer complaint is mattresses changing hardness or firmness during the night and/or as a function of room temperatures. The hardness or firmness of viscoelastic flexible foams is often temperature related. Recent developments have been directed to solving the temperature sensitivity of viscoelastic flexible foams. It was recently found that foams having a ratio of the storage modulus at 15° C. to the storage modulus at 30° C. of less than or equal to 5 to about 1, and a $T_g$ of less than 20° C. as measured by tan delta are less sensitive to temperature changes.

In spite of the recent development in this area, there continues to be a need to further improve the compression sets and IFD values of the foams while maintaining the decreased temperature sensitivity. The present invention is directed to solving this problem.

SUMMARY

The novel viscoelastic flexible polyurethane foams comprise the reaction product of:
(1) a diisocyanate and/or a polyisocyanate component,
(2) an isocyanate-reactive component comprising:
   (a) from 20 to 100% by weight, based on 100% by weight of components (2)(a) and (2)(b), of a polyol blend having a hydroxyl number of from about 56 to about 250, an average functionality of greater than about 2, and which comprises:
      (i) a monofunctional polyether having a hydroxyl number of less than or equal to 56, and containing less than or equal to 20% by weight of copolymerized oxyethylene, based on the total weight of monofunctional polyether (a)(i),
      (ii) a polyether polyol having a hydroxyl number of from 47 to 300, a nominal functionality of 2, and containing from about 5 to about 45% by weight of copolymerized oxyethylene, based on the total weight of polyether polyol (a)(ii),
   and
      (iii) a polyether polyol having a hydroxyl number of about 47 to about 300, a nominal functionality of greater than 2 to about 8, and containing from about 5 to about 45% by weight of copolymerized oxyethylene, based on the total weight of polyether polyol (a)(iii);
   wherein (a) the polyol blend comprises 20 to 50% by weight of (i) the monofunctional polyether and the balance of (a) comprises components (ii) and (iii) in which from 10 to 90% by weight of the balance comprises component (ii) and from 90 to 10% by weight of the balance comprises component (iii);
   and, optionally,
   (b) up to 80% by weight, based on 100% by weight of components (2)(a) and (2)(b), of a polyether polyol having an average functionality of 2 to 8, a hydroxyl number of 20 to 300 and comprising at least 50% by weight of copolymerized oxyethylene, based on the total weight of the polyether polyol (2)(b);
   and
(3) a hydroxyl-terminated prepolymer comprising the reaction product of:
   (a) a diisocyanate and/or polyisocyanate component;
   and
   (b) an isocyanate-reactive component comprising:
      (i) a polyether polyol having a nominal functionality of about 3, and a hydroxyl number ranging from 100 to 200;
      or
      (ii) castor oil;
   wherein the equivalent ratio of (3)(b) the isocyanate-reactive component to (3)(a) the diisocyanate and/or polyisocyanate component (a) ranges from 5:1 to 10:1, or preferably from 5:1 to 6:1;
in the presence of:
(4) a blowing agent;
(5) a catalyst;
and
(6) a surfactant.

The process of preparing the viscoelastic flexible polyurethane foams comprises reacting:
(1) a diisocyanate and/or polyisocyanate component,
(2) an isocyanate-reactive component comprising:
   (a) from 20 to 100% by weight, based on 100% by weight of components (2)(a) and (2)(b), of a polyol blend having a hydroxyl number of from about 56 to about 250, an average functionality of greater than about 2, and which comprises:
      (i) a monofunctional polyether having a hydroxyl number of less than or equal to 56, and containing less than or equal to 20% by weight of copolymerized oxyethylene, based on the total weight of monofunctional polyether (a)(i),
      (ii) a polyether polyol having a hydroxyl number of from 47 to 300, a nominal functionality of 2, and containing from about 5 to about 45% by weight of copolymerized oxyethylene, based on the total weight of polyether polyol (a)(ii),
   and
      (iii) a polyether polyol having a hydroxyl number of about 47 to about 300, a nominal functionality of greater than 2 to about 8, and containing from about 5 to about 45% by weight of copolymerized oxyethylene, based on the total weight of polyether polyol (a)(iii);

wherein (a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% by weight of the balance comprises component (iii);

and, optionally, (b) up to 80% by weight, based on 100% by weight of components (2)(a) and (2)(b), of one or more polyether polyols having an average functionality of 2 to 8, a hydroxyl number of 20 to 300 and comprising at least 50% by weight of copolymerized oxyethylene, based on the total weight of the polyether polyol (2)(b);

and (3) a hydroxyl-terminated prepolymer comprising the reaction product of:

(a) a diisocyanate and/or polyisocyanate component; and (b) an isocyanate-reactive component comprising:

(i) a polyether polyol having a nominal functionality of about 3, and a hydroxyl number ranging from 100 to 200;

or (ii) castor oil;

wherein the equivalent ratio of (3)(b) the isocyanate-reactive component to (3)(a) the diisocyanate and/or polyisocyanate component (a) ranges from 5:1 to 10:1, or preferably from 5:1 to 6:1;

in the presence of:

(4) a blowing agent;

(5) a catalyst;

and (6) a surfactant.

In other embodiments, the isocyanate-reactive component (2) for the viscoelastic polyurethane foams and the process of preparing the viscoelastic polyurethane foams may comprise at least one of: (c) one or more polyether polyols, which are different than (a)(ii) and (a)(iii), having an OH number of from about 10 to about 300, an average functionality of from about 2 to about 8, and which contain from 0 to 45% by weight of copolymerized oxyethylene, based on 100% by weight of component (c); and/or (d) one or more filled polyols which are also commonly referred to as polymer polyols.

In another embodiment, the polyol blend (2)(a) comprises an in-situ formed polyol blend. These in-situ formed polyol blends (a) can be used in the polyurethane foams and/or in the process of preparing the viscoelastic polyurethane foams described herein. The in-situ formed polyol blend (a) is prepared by:

A) introducing into a reaction vessel a mixture comprising:

(1) an initial starter ($S_i$) comprising one or more monofunctional compounds having a hydroxyl number of less than about 56, and (2) a DMC (double metal cyanide) catalyst, B) feeding (1) an epoxide comprising propylene oxide and ethylene oxide in a weight ratio of from 100:0 to 20:80, into the reaction vessel;

C) allowing the epoxide mixture and the initial starter ($S_i$) to react and continuing to polymerize by feeding the epoxide until the equivalent weight of the monofunctional compound is increased by at least 10% by weight and reaches a value between about 1,500 and about 6,000;

D) continuously adding (1) one or more low molecular weight starters ($S_c$) having a nominal functionality of greater than 2 to about 6, and an equivalent weight of about 28 to about 400 into the reaction vessel while continuing to feed epoxide;

E) completing addition of the continuous starter ($S_c$); and

F) allowing the mixture to continue to polymerize in the reaction vessel thereby forming (a) an in-situ formed polyol blend which has an overall hydroxyl number of from about 56 to about 250, an average functionality of greater than about 2, and which comprises (i) one or more monofunctional polyethers having a hydroxyl number of less than or equal to 56, and containing less than or equal to 20% by weight of copolymerized oxyethylene, based on 100% by weight of (a)(i);

(ii) one or more polyether polyols having a hydroxyl number of 47 to 300, a nominal functionality of 2 and containing from about 5 to about 45% by weight of copolymerized oxyethylene, based on the total weight of the polyether polyol (a)(ii);

and (iii) one or more polyether polyols having a hydroxyl number of about 47 to about 300, a nominal functionality of greater than 2 to about 8, and containing from about 5 to about 45% by weight of copolymerized oxyethylene, based on the total weight of the polyether polyol (a)(iii);

wherein (a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% by weight of the balance comprises component (iii).

and, optionally, (II) blending the in-situ formed polyol blend (a) with (b) up to 80% by weight, based on 100% by weight of components (a) and (b), of one or more polyether polyols having an average functionality of 2 to 8, a hydroxyl number of 20 to 300 and containing at least 50% of copolymerized oxyethylene, based on the total by weight of the polyether polyol (b).

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

The nominal molecular weight is the nominal number average equivalent weight multiplied by the starter functionality. The nominal hydroxyl number equals 56,100 divided by the nominal equivalent weight.

As used herein, the term "nominal functionality" refers to the functionality of a polyether polyol which is based solely on the functionality of the starter compound or initiator used in preparing the polyether polyol. The nominal functionality is typically used to describe the functionality of a specific compound.

As used herein, the term "average functionality" refers to the average number of reactive groups (e.g. hydroxyl, amine, etc.) which are present per molecule of the polyether polyol or polyether polyol blend being described. This term is typically used when either a polyether polyol is prepared from two or more starter compounds or initiators that have different functionalities and/or when a blend of polyether polyols is used in which the individual polyether polyols have different functionalities.

All hydroxyl numbers (i.e. OH numbers) herein were determined according to ASTM D4274-11, and are reported in mg KOH/g polyol.

Isocyanate index is the relative stoichiometric amount of isocyanate functional groups necessary to react with the isocyanate reactive groups present in the overall foam formulation. It is expressed as a percentage in this application; thus equal stoichiometric amounts of isocyanate functional groups and isocyanate reactive functional groups in the formulation provide an isocyanate index of 100%.

As used herein, the term "hydroxyl-terminated prepolymers" contain terminal hydroxyl groups and refers to a composition formed by reacting an isocyanate component with an isocyanate-reactive component (e.g. a polyether polyol) in which there is a stoichiometric excess of isocyanate-reactive groups to isocyanate functional groups. Hydroxyl-terminated prepolymers have an equivalent ratio of OH groups of the isocyanate-reactive component to NCO groups of the isocyanate component of greater than 1:1.

As used herein, the term "viscoelastic flexible foam" or "viscoelastic flexible polyurethane foam" refers to low-resilience polyurethane foam and is commonly referred to as memory foam. These foams typically provide uniform support of any weight placed on the foam targeted to relieve pressure points, and the foam recovers slowly to its original shape once the weight is removed. These foams are mainly used for bedding, pillows, etc.

Suitable diisocyanates and polyisocyanates to be used as component (1) in the invention include, for example, isocyanate-functional compounds which contain two or more free NCO groups per molecule and are known to be useful for preparing flexible polyurethane foam. Suitable isocyanate-functional compounds include aromatic, aliphatic, and cycloaliphatic di- and/or polyisocyanates. Some examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof. Suitable polyisocyanates include toluene diisocyanate (TDI, which is usually a mixture of 2,4- and 2,6-isomers), diphenylmethane diisocyanate (MDI which is usually a mixture of the 2,2'-, the 2,4'- and the 4,4'-isomers), and various mixtures thereof. In one embodiment, the isocyanate-functional compound comprises toluene diisocyanate.

In the isocyanate-reactive component (2), the polyol blend (a) has an overall hydroxyl number of from about 56 to about 250 and an average functionality of greater than about 2. This polyol blend may have a hydroxyl number of at least about 56, or at least about 70, or at least about 80, or at least about 90. This polyol blend may also have a hydroxyl number of about 250 or less, or less than 120, or about 118 or less, or about 110 or less. The in-situ formed polyol blend (a) may have a hydroxyl number ranging between any combination of these upper and lower values, inclusive, such as from at least about 56 to about 250 or less, or from at least about 70 to less than 120, or from at least about 80 to less than or equal to 118, or from at least about 90 to about 110.

In the isocyanate-reactive component (2), the polyol blend (a) also typically has an average functionality of greater than about 2. This polyol blend may have an average functionality of greater than about 2, or at least about 2.1. The average functionality of this polyol blend may also be about 6 or less, or about 4 or less. The polyol blend (a) may have an average functionality ranging between any combination of these upper and lower values, inclusive, such as greater than about 2 to about 6 or less, or at least about 2.1 to about 4 or less.

Suitable (2) isocyanate-reactive components for the viscoelastic flexible polyurethane foams and process of preparing the viscoelastic flexible foams comprise:

(a) from 20 to 100% by weight, based on 100% by weight of components (2)(a) and (2)(b), of a polyol blend having a hydroxyl number of from about 56 to about 250, (or from at least about 70 to less than 120, or from at least about 80 to less than or equal to 118, or from at least about 90 to about 110), an average functionality greater than about 2, and comprising:

(i) one or more monofunctional polyethers having a hydroxyl number of less than or equal to 56, and containing less than or equal to 20% by weight of copolymerized oxyethylene, based on 100% by weight of (a)(i);

(ii) one or more polyether polyols having a hydroxyl number of from 47 to 300, a nominal functionality of 2, and containing from about 5 to about 45% of copolymerized oxyethylene, based on the total weight of the polyether polyol (a)(ii); and (iii) one or more polyether polyols having a hydroxyl number of about 47 to about 300, an nominal functionality of greater than 2 to about 8, and containing from about 5 to about 45% by weight of copolymerized oxyethylene, based on the total weight of the polyether polyol (a)(iii);

wherein (2)(a) the polyol blend comprises 20 to 50% by weight of (i) the one or more monofunctional polyethers and the balance of (a) comprises components (ii) and (iii) in which from 10 to 90% by weight of the balance comprises component (ii) and from 90 to 10% of the balance comprises component (iii);

and, optionally, (b) up to 80% by weight, based on 100% by weight of components (2)(a) and (2)(b), of one or more polyether polyols having an average functionality of 2 to 8, a hydroxyl number of 20 to 300 and comprising at least 50% of copolymerized oxyethylene, based on the total weight of the polyether polyol (2)(b).

In another embodiment, the relative amounts of (2)(a) and (2) (b) are 20% to 100% by weight of (2)(a) and up to 80% by weight of (2)(b), or from 85% to 99% by weight of (2)(a) and from 1% to 15% by weight of (2)(b), based on 100% by weight of isocyanate-reactive component (2).

Suitable monofunctional polyethers for component (2)(a)(i) include those monols having a hydroxyl number of less than or equal to 56, or of less than or equal to 28.

Suitable starters for (2)(a)(i) include polyoxyalkylene monols formed by addition of multiple equivalents of epoxide to low molecular weight monofunctional starters such as, for example, methanol, ethanol, phenols, allyl alcohol, longer chain alcohols, etc., and mixtures thereof. Examples of suitable longer chain alcohols include $C_{12}$, $C_{13}$, $C_{14}$ and/or $C_{15}$ monols, which may be used individually or as mixtures. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group. Suitable monofunctional starters include those monols described in, for example, U.S. Pat. Nos. 6,391,935 and 6,821,308, the disclosures of which are hereby incorporated by reference.

In one embodiment, the polyoxyalkylene monol starter comprises a polyoxypropylene monol having a hydroxyl number of less than or equal to 56. These compounds facilitate DMC catalyzed addition of epoxide and provide good build ratios for the production of polyol blends (2)(a).

The monofunctional polyethers may also be characterized in one embodiment as containing up to about 20% by weight of copolymerized oxyethylene, based on the total weight of the monofunctional polyether. This weight percentage includes the initiator or starter and all of the added epoxide(s). These monofunctional polyethers may contain less than or equal to about 20% by weight, or less than or equal to about 15% by weight, or less than or equal to about 10% by weight, based on 100% by weight of the monofunctional polyether, of copolymerized oxyethylene. These monofunctional polyethers may also contain more than 0%, or at least about 2% or at least about 5%, based on the total weight of the monofunctional polyether, of copolymerized oxyethylene. The amount of copolymerized oxyethylene present in the monofunctional polyethers may vary between any combination of these upper and lower values, inclusive, such as, of more than 0% to less than or equal to about 20%, or at least about 2% to less than or equal to about 15%, or at least about 5% to less than or equal to about 10% by weight.

The monofunctional polyethers can have virtually any desired arrangement of oxyalkylene units with the proviso that these contain less than 20% of copolymerized oxyethylene, based on the total weight of the monofunctional polyether. This weight percentage includes the initiator or starter and all of the added epoxide(s). In general, all of the oxyethylene units are not concentrated at the end of the polyoxyalkylene monols such that the primary hydroxyl group content of the monol is less than 23% by weight. Some examples of suitable monofunctional polyethers include PO homopolymers, block EO-PO copolymers, random EO/PO copolymers, PO polymers that are "tipped" with EO or with a mixture of EO and PO are possible but not preferred. These "tipped" PO polymers should use a mixture of EO and PO to achieve a particular oxyethylene content and/or a desired primary hydroxyl content (less than 23%), or any other desired configuration. The so-called PO homopolymers are suitable with the proviso that they satisfy the above described amounts of copolymerized oxyethylene.

Suitable polyether polyols for component (2)(a)(ii) typically have a hydroxyl number of from about 47 to about 300, and a nominal functionality of 2. These polyether polyols may have hydroxyl numbers of from at least about 47, or from at least about 70. The polyether polyols may also have hydroxyl numbers of less than or equal to 300, or of less than or equal to 240. Suitable polyether polyols may also have a hydroxyl number ranging between any combination of these upper and lower values, inclusive, of from at least about 47 to about 300, or from at least about 70 to about 240. These polyether polyols (2)(a)(ii) may be prepared from low molecular weight starters such as, for example, propylene glycol, dipropylene glycol, ethylene glycol, tripropylene glycol, water, methyl-1,3-propanediol, and the like, and mixtures thereof.

Suitable polyether polyols for component (2)(a)(ii) contain from about 5 to about 45% by weight of copolymerized oxyethylene. These polyether polyols may contain at least about 5%, or at least about 10%, or at least about 15%, of copolymerized oxyethylene, based on the total weight of the polyether polyol (2)(a)(ii). These polyether polyols may contain about 45% or less, or about 40% or less, or about 35% or less of copolymerized oxyethylene, based on the total weight of the polyether polyol (2)(a)(ii). The total weight of the polyether polyol includes the starter or initiator, and the all of the added epoxide(s). Suitable polyether polyols herein may contain any amount of copolymerized oxyethylene between the above disclosed upper and lower values, inclusive, unless otherwise stated, such as at least about 5% to about 45% by weight or less, or at least about 10% to about 40% by weight or less, or at least about 15% to about 35% by weight or less.

These polyether polyols (2)(a)(ii) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration. The epoxides can be polymerized using well-known techniques and a variety of catalysts, including alkali metals, alkali metal hydroxides and alkoxides, double metal cyanide complexes, and many more.

Suitable polyether polyols for component (2)(a)(iii) typically have a hydroxyl number of from about 47 to about 300, a nominal functionality of greater than 2 to about 8. These polyether polyols may also have hydroxyl numbers of from at least about 47, or from at least about 70. The polyether polyols may also have hydroxyl numbers of less than or equal to 300, or of less than or equal to 240. Suitable polyether polyols may also have a hydroxyl number ranging between any combination of these upper and lower values, inclusive, of from at least about 47 to about 300, or from at least about 70 to about 240. The polyether polyols may also have a nominal functionality of greater than 2, or of at least about 3. The nominal functionality of the polyether polyols may also be less than or equal to about 8, or less than or equal to about 6. Suitable polyether polyols may have a nominal functionality ranging between any combination of these upper and lower values, inclusive, such as from greater than 2 to about 8, or from at least about 3 to about 6. These polyether polyols (2)(a)(iii) may be prepared from low molecular weight starters such as, for example, glycerin, trimethylolpropane, pentaerythritol, sucrose, sorbitol, and the like, and mixtures thereof.

Suitable polyether polyols for component (2)(a)(iii) contain from about 5 to about 45% by weight of copolymerized oxyethylene. These polyether polyols may contain at least about 5%, or at least about 10%, or at least about 15%, of copolymerized oxyethylene, based on the total weight of the polyether polyol (2)(a)(iii). These polyether polyols may contain about 45% or less, or about 40% or less, or about 35% or less of copolymerized oxyethylene, based on the total weight of the polyether polyol (2)(a)(iii). The total weight of the polyether polyol includes the starter or initiator, and the all of the added epoxide(s). Suitable polyether polyols herein may contain any amount of copolymerized oxyethylene between the above disclosed upper and lower values, inclusive, unless otherwise stated, such as at least about 5% to about 45% by weight or less, or at least about 10% to about 40% by weight or less, or at least about 15% to about 35% by weight or less.

These polyether polyols (2)(a)(iii) can be block EO-PO copolymers, EO-capped polyoxypropylenes, random EO/PO copolymers, PO polymers that are "tipped" with a mixture of EO and PO to achieve the desired amount of copolymerized oxyethylene and/or a particular primary hydroxyl content, or any other desired configuration. The epoxides can be polymerized using well-known techniques and a variety of catalysts, including alkali metals, alkali metal hydroxides and alkoxides, double metal cyanide complexes, and many more.

In accordance with the invention, the polyol blend (2)(a) comprises from about 20% to about 50%, or from about 25 to about 45% by weight of (i) the monofunctional polyethers and the balance of the polyol blend comprises components (ii) and (iii), in which from about 10 to about 90%, or from about 15 to 85% by weight of the balance comprises component (ii) and from about 90% to about 10%, or from about 85 to 15% by weight of the balance comprises component (iii).

The isocyanate-reactive component (2) additionally comprise (2)(b) one or more polyether polyols. Suitable polyether polyols (2)(b) include those polyols which have an average functionality of from 2 to 8, a hydroxyl number of at least about 20 to about 300 or less, and contain at least 50% of copolymerized oxyethylene, based on the total by weight of the polyether polyol (2)(b). As previously stated, these polyether polyols are different than the polyether polyols (2)(a)(ii) and (2)(a)(iii). Suitable polyether polyols for component (2)(b) may commonly be referred to as cell opening polyols.

These polyether polyols for component (2)(b) may have hydroxyl numbers of at least about 20 mg KOH/g, or at least about 30 mg KOH/g, or at least about 35 mg KOH/g. In addition, the polyether polyols generally have hydroxyl numbers of about 300 mg KOH/g or less, or about 170 mg KOH/g or less, or about 50 mg KOH/g or less. The suitable polyether polyols of the present invention may be characterized by a hydroxyl number between any combination of these upper and lower values, inclusive, unless otherwise stated, such as, at least about 20 to about 300 mg KOH/g or less, or at least about 30 to about 170 mg KOH/g or less, or at least about 35 mg KOH/g to about 50 mg KOH/g or less.

The average functionality of these polyether polyols (2)(b) ranges is at least 2, or at least about 2.5. The average functionality is also typically about 8 or less, or about 6 or less. The average functionality of the polyether polyols (2)(b) may range between any combination of these upper and lower values, inclusive, such as at least about 2 to about 8 or less, or at least about 2.5 to about 6 or less.

Suitable polyether polyols used as component (2)(b) may also contain at least 50% to about 99% by weight or less of copolymerized oxyethylene, based on the total weight of the polyether polyol. The total weight of the polyether polyol includes the starter or initiator, and the all of the added epoxide(s). These polyether polyols may contain at least about 50%, or at least about 60% or at least about 70% by weight, of copolymerized oxyethylene, based on the total weight of the polyether polyol. These polyether polyols may also contain about 99% or less, or about 90% or less, or about 85% or less of copolymerized oxyethylene, based on the total weight of the polyether polyol. Suitable polyether polyols herein may contain any amount of copolymerized oxyethylene between the above disclosed values, inclusive, such as at least about 50% to about 99% or less, or at least about 60% to about 90% or less, or at least about 70% to about 85% by weight or less, of copolymerized oxyethylene.

Some examples of suitable polyether polyols for component (2)(b) include those compounds which are conveniently made by reacting compounds having two or more active hydrogens (e.g., glycols, triols, tetrols, hexols, polyfunctional amines and other polyfunctional starters known to those in the art) with one or more equivalents of an epoxide as described earlier. Examples of suitable starters for these polyether polyols (b) include low molecular weight starters such as, for example, glycerin, propylene glycol, dipropylene glycol, ethylene glycol, trimethylolpropane, sucrose, sorbitol, tripropylene glycol, water, methyl-1,3-propanediol, pentaerythritol, and the like, and mixtures thereof.

Suitable epoxides for component (2)(b) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

These polyether polyols can have any desired arrangement of oxyalkylene units with the proviso that they contain at least 50% of copolymerized oxyethylene, based on the total weight of the polyether polyol. Thus, the polyether polyols (2)(b) can be EO homopolymers, block EO-PO copolymers, EO-capped polyoxypropylenes, PO capped polyoxyethylenes, random EO/PO copolymers, PO polymers that are "tipped" with a mixture of EO and PO to achieve the desired amount of copolymerized oxyethylene and/or a particular primary hydroxyl content, or any other desired configuration.

The isocyanate-reactive component (2) herein may additionally comprise components (2)(c) and/or (2)(d). Components (2)(c) and/or (2)(d) may be present in amounts of from 0 to about 50% by weight, or from about 1 to about 40% by weight, based on 100% by weight of components (2)(a), (2)(b), (2)(c) and (2)(d).

In one embodiment, these isocyanate-reactive component (2) additionally comprise (2)(c) one or more polyether polyols having an OH number of from about 10 to about 300, an average functionality of from about 2 to about 8, and containing from 0 to 45% by weight of copolymerized oxyethylene, based on the total weight of component (2)(c).

Suitable compounds to be used as polyether polyols (2)(c) include those polyols which have an average functionality of at least about 2 to about 8 or less, a hydroxyl number of at least about 10 to about 300 or less, and contain from 0% to about 45% by weight of copolymerized oxyethylene, based on the total weight of the polyether polyol (2)(c). These polyether polyols are different than the polyether polyols (2)(a)(ii) and the polyether polyols (2)(a)(iii).

These polyether polyols for component (2)(c) may have hydroxyl numbers of from at least about 10 mg KOH/g, or at least about 20 mg KOH/g, or at least about 25 mg KOH/g. In addition, the polyether polyols generally have hydroxyl numbers of about 300 mg KOH/g or less, or about 150 mg KOH/g or less, or about 75 mg KOH/g or less. The suitable polyether polyols of the present invention may be characterized by a hydroxyl number between any combination of these upper and lower values, inclusive, unless otherwise stated, such as, from at least about 10 to about 300 mg KOH/g or less, or at least about 20 to about 150 mg KOH/g or less, or at least about 25 mg KOH/g to about 75 mg KOH/g or less.

The average functionality of these polyether polyols (2)(c) ranges from at least about 2 to about 8 or less. These polyether polyols may also have an average functionality of at least about 2, or at least about 2.5, or at least about 3. These polyether polyols may have an average functionality of 8 or less, or of 6 or less, or of 4 or less. In addition, these polyether polyols may have an average functionality between any combination of these upper and lower values, inclusive, such as at least about 2 to about 8 or less, or at least about 2.5 to about 6 or less, or at least about 3 to about 4 or less.

Some examples of suitable polyether polyols for component (2)(c) include those compounds which are conveniently made by reacting compounds having two or more active hydrogens (e.g. glycols, triols, tetrols, hexols, polyfunctional amines and other polyfunctional starters known to those in the art) with one or more equivalents of an epoxide as described earlier. Examples of suitable starters for these polyether polyols (2)(c) include low molecular weight starters such as, for example, glycerin, propylene glycol, dipropylene glycol, ethylene glycol, trimethylolpropane, sucrose, sorbitol, tripropylene glycol, water, methyl-1,3-propanediol, pentaerythritol, and the like, and mixtures thereof.

Suitable epoxides for component (2)(c) can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes and many more.

In one embodiment, the isocyanate-reactive component (2) may additionally comprise (2)(d) one or more filled polyols which are also known as polymer polyols. Examples of suitable filled polyols for the invention include, for example, (2)(d)(i) styrene/acrylonitrile polymer polyols, (2)(d)(ii) polyisocyanate polyaddition (PIPA) polyols which are dispersions of polyurethanes formed by the in-situ reaction of an isocyanate and an alkanolamine, (2)(d)(iii) polyhydrazodicarbonamide dispersion polyols (also known as PHD polyols), and (2)(d)(iv) mixtures thereof.

Suitable (2)(d)(i) SAN polymer polyols herein are prepared by free radical polymerization of monomers (i.e. styrene and acrylonitrile) in a polyol carrier (or base polyol) to produce a free radical polymer dispersed in the polyol carrier (or base polyol). Conventionally, the solids content of SAN polymer polyols is from about 5% up to about 60% by weight of solids, based on the total weight of the SAN polymer polyol composition. The amount of solids content may range between any combination of these upper and lower values, inclusive, such as from about 5% to about 60%, or from about 10% to about 50% by weight of solids, based on the total weight of the SAN polymer polyol composition.

The SAN polymer polyols suitable for the present invention are prepared by the in-situ polymerization of acrylonitrile and styrene, in a base polyol. Examples of suitable SAN polymer polyols to be used as component (2)(d) herein include those SAN polymer polyols disclosed in, for example, but are not limited to, U.S. Pat. Nos. 5,321,077, 5,324,774, 5,364,906, 5,358,984, 5,453,469, 5,488,085, 5,496, 894, 5,554,662, 5,594,066, 5,814,699, 5,824,712, 5,916,994, 5,995,534, 5,990,185, 6,117,937, 6,455,603, 6,472,447, 6,624,209, 6,713,599, 6,756,414, 7,179,882, 7,759,423, 7,776,969, 8,383,733, 8,835,565, 8,946,313, 8,987,396, 9,505,881, 10,040,903, etc., the disclosures of which are hereby incorporated by reference.

Suitable polyisocyanate polyaddition (PIPA) polyols for component (d) contain polyurethane particles dispersed in a polyol carrier (i.e. base polyol). The polyurethane particles in PIPA polyols are formed in-situ by the reaction of an isocyanate with an alkanolamine (e.g., triethanolamine). The solids content of the PIPA polyols may typically range from 5% up to about 60% by weight, based on the total weight of the PIPA composition. The amount of solids content may range between any combination of these upper and lower values, inclusive, such as from about 5% to about 60%, or from about 10% to about 50% by weight of solids, based on the total weight of the PIPA composition.

Examples of suitable PIPA polyols can be found in, for example, U.S. Pat. Nos. 4,374,209 and 5,292,778, the disclosures of which are herein incorporated by reference.

Suitable polyhydrazodicabonamide polyols (which are also commonly referred to as PHD polyols or PHD dispersion polyols) to be used as component (2)(d) of the present invention include, for example, those compounds which are typically prepared by the in-situ polymerization of an isocyanate mixture with an amine group containing compound such as, a diamine and/or a hydrazine, in a base polyol. Suitable base polyols typically comprise polyether polyols and polyoxyalkylene polyols. Methods for preparing PHD polymer polyols are described in, for example, U.S. Pat. Nos. 4,089,835 and 4,260,530, the disclosures of which are hereby incorporated by reference.

PHD polyols typically have solids contents within the range of from about 3 to about 30 weight %, based on the total weight of the PHD polyol. The PHD polyols may have a solids content that ranges between any combination of these upper and lower values, inclusive, such as from about 3% to about 30% by weight, or from about 5 to about 25% by wt., based on the total weight of the PHD polyol.

PHD polymer modified polyols are typically prepared by the in-situ polymerization of an isocyanate mixture with a diamine and/or hydrazine in a base polyol, preferably, a polyether polyol. Methods for preparing PHD polymer polyols are described in, for example, U.S. Pat. Nos. 4,089, 835, 4,260,530 and 4,324,715, the disclosures of which are hereby incorporated by reference.

In one embodiment, the polyol blend (2)(a) may be continuously added and mixed in-line prior to the foam mixhead.

In another embodiment, the polyol blend (2)(a) may comprise an in-situ formed polyol blend.

The polyol blend (2)(a) may be also comprise a mixture that is prepared by combining components (2)(a)(i), (2)(a)(ii) and (2)(a)(iii).

The in-situ formed polyol blends suitable for use as (2)(a) may be formed by

A) introducing into a reaction vessel a mixture comprising:
(1) an initial starter ($S_i$) comprising one or more monofunctional compounds having a hydroxyl number of less than about 56,
and
(2) a DMC (double metal cyanide) catalyst, B) feeding
(1) an epoxide comprising propylene oxide and ethylene oxide in a weight ratio of from 100:0 to 20:80,
into the reaction vessel;

C) allowing the epoxide mixture and the initial starter ($S_i$) to react and continue polymerizing by feeding the epoxide until the equivalent weight of the monofunctional compound is increased by at least 10% by weight and reaches a value between about 1,500 and about 6,000;

D) continuously adding
(1) one or more low molecular weight starters ($S_c$) having a functionality of greater than 2 to about 6, and an equivalent weight of about 28 to about 400 into the reaction vessel while continuing to feed epoxide;

E) completing addition of the continuous starter ($S_c$); and

F) allowing the mixture to continue to polymerize in the reaction vessel thereby forming (a) an in-situ formed polyol blend having an overall hydroxyl number of from about 56 to about 250, an average functionality of greater than 2, and which comprises (i) one or more monofunctional polyethers having a hydroxyl number of less than or equal to 56, and containing less than 20% by weight of copolymerized oxyethylene, based on 100% by weight of the monofunctional polyethers (a)(i);

(ii) one or more polyether polyols having a hydroxyl number of 47 to 300, a nominal functionality of 2 and containing from about 5 to about 45% by weight of copolymerized oxyethylene, based on 100% by weight of the polyether polyols (a)(ii); and (iii) one or more polyether polyols having a hydroxyl number of about 47 to about 300, a nominal functionality of greater than 2 to about 8, and containing from about 5 to about 45% by weight of copolymerized oxyethylene, based on 100% by weight of the polyether polyols (a)(iii);

wherein (a) said polyol blend comprises from 20 to 50% by weight of (i) said monofunctional polyether monols and the balance of (a) comprises components (ii) and (iii) in which from 10 to 90% by weight of the balance comprises component (ii) and from 90 to 10% by weight of the balance comprises component (iii);

and, optionally, (II) combining the resultant in-situ produced polyol blend (a) with (b) up to 80% by weight, based on 100% by weight of components (a) and (b), of at least one polyether polyol having an average functionality of 2 to 8, a hydroxyl number of 20 to 300 and containing at least 50% of copolymerized oxyethylene, based on 100% by weight of the polyether polyol (b).

In general, any epoxide polymerizable using DMC catalysis can be used in the in-situ production of the polyol blend comprising a monofunctional polyether and two different polyether polyols. Suitable epoxides include ethylene oxide, propylene oxide, butylene oxides (e.g., 1,2-butylene oxide, isobutylene oxide), styrene oxide, and the like, and mixtures thereof. Polymerization of epoxides using DMC catalysts and hydroxyl-containing starters results in polyether polyols, as is well understood in the art.

Other monomers that will copolymerize with an epoxide in the presence of a DMC catalyst may be included in the process of the invention to make other types of epoxide polymers. Some examples include epoxides copolymerize with oxetanes as described in U.S. Pat. No. 3,404,109, the disclosure of which is herein incorporated by reference, to give polyethers, or with anhydrides to give polyesters or polyetheresters as described in U.S. Pat. Nos. 5,145,883 and 3,538,043, the disclosures of which are herein incorporated by reference, or with carbon dioxide to form polyethercarbonate polyols such as those described in U.S. Pat. Nos. 4,826,887, 4,826,952, 4,826,953, 6,713,599, 7,977,501, 8,134,022, 8,324,419, 8,946,466 and 9,249,259, the disclosures of which are herein incorporated by reference, and U.S. Published Patent Application 2015/0232606.

In accordance with this process, an initially charged starter ($S_i$) is used, and the initially charged starter ($S_i$) is different than the continuously added starter ($S_c$). The initially charged starter, $S_i$, is comprised of, either totally or in large part, one or more compounds having one active hydrogen per molecule that can serve as a site for epoxide addition. The preferred starters are polyether monols formed by addition of multiple equivalents of epoxide to low molecular weight monofunctional starters such as, for example, methanol, ethanol, phenols, allyl alcohol, longer chain alcohols, etc., and mixtures thereof. Suitable epoxides can include, for example, ethylene oxide, propylene oxide, butylene oxide, styrene oxide, etc. and mixtures thereof. The epoxides can be polymerized using well-known techniques and a variety of catalysts, including alkali metals, alkali metal hydroxides and alkoxides, double metal cyanide complexes, and many more. Suitable monofunctional starters can also be made, for example, by first producing a diol or triol and then converting all but one of the remaining hydroxyl groups to an ether, ester or other non-reactive group.

One suitable class of polyether monol starters, $S_i$, includes polyoxypropylene monols having a hydroxyl number of less than or equal to about 56. These compounds facilitate DMC catalyzed addition of epoxide and provide suitable build ratios for the production of the in-situ formed polyether polyol blends herein.

In the process of the present invention, the quantity of an $S_i$ used depends on many factors, including, for example, the reactor dimensions, the identity of the $S_i$, the equivalent weights of the $S_i$ and of the target product, the equivalent weight of the $S_c$, and other factors. In general, the amount of $S_i$ is within the range of about 2 to about 75 mole % of the total moles of $S_i$ and $S_c$. The total amount of starter ($S_t$) equals the sum of the amount of continuously added starter ($S_c$) plus the amount of initially charged starter ($S_i$). Thus, $S_t = S_c + S_i$.

Suitable catalysts comprise double metal cyanide (DMC) catalysts. Any DMC catalyst known in the art is suitable for use in the process of the present invention. These well-known catalysts are the reaction products of a water-soluble metal salt (e.g., zinc chloride) and a water-soluble metal cyanide salt (e.g., potassium hexacyanocobaltate). Preparation of suitable DMC catalysts is described in many references, including, for example, U.S. Pat. Nos. 5,158,922, 4,477,589, 3,427,334, 3,941,849, 5,470,813, and 5,482,908, the disclosures of which are incorporated herein by reference. One suitable type of DMC catalysts are zinc hexacyanocobaltates.

The DMC catalyst includes an organic complexing agent. As disclosed in the preceding references, the complexing agent is needed for an active catalyst. Suitable complexing agents are water-soluble heteroatom-containing organic compounds that can complex with the DMC compound, as well as water-soluble aliphatic alcohols. An example of a suitable aliphatic alcohol is tert-butyl alcohol. The DMC catalyst may include, in addition to the organic complexing agent, a polyether, as is described in U.S. Pat. No. 5,482,908, the disclosure of which is herein incorporated by reference.

Suitable DMC catalysts for use in the process are highly active catalysts such as those described in U.S. Pat. Nos. 5,482,908 and 5,470,813, the disclosures of which are herein incorporated by reference. High activity allows the catalysts to be used at very low concentrations, and possibly at concentrations which are low enough to overcome any need to remove the catalyst from the finished blends of in-situ formed polyol blends.

The process of the invention also requires a continuously added polyfunctional starter ($S_c$). Conventional processes for making polyether polyols, including KOH-catalyzed and DMC-catalyzed processes, charges the catalyst and all of the starter to be used to the reactor at the start of the polymerization, and then adds the epoxide continuously. In the process of forming an in-situ formed polyol blend suitable for the invention, the DMC catalyst and an initial monofunctional starter ($S_i$) are charged to the reactor followed by epoxide feed and polymerization until the monol reaches the desired equivalent weight. At this point, the feed of continuously added polyfunctional starter ($S_c$) is begun and it proceeds at a continuous controlled rate relative to the continuing epoxide feed until the addition of the continuous starter ($S_c$) is completed. Epoxide feed is continued until the desired overall OH number, is reached. The $S_c$ may be mixed with the epoxide and added, or it may be added as a separate stream.

The $S_c$ is typically a low molecular weight polyol or a blend of low molecular weight polyols. Low molecular weight polyols as defined in this application have from about 2 hydroxyl groups to about 8 hydroxyl groups. It also may be beneficial to add more than one $S_c$ having different functionalities either simultaneously or sequentially. The functionality of the $S_c$ or multiple $S_c$ should be chosen such at the average functionality of the resultant polyol is greater than 2.0 up to about 6, or from about 2.5 up to about 3. These low molecular weight polyols may have at least about 2 hydroxyl groups, or greater than 2 hydroxyl groups, or at least about 2.5 hydroxyl groups. These low molecular weight polyols may also have about 8 hydroxyl groups or less, or about 6 hydroxyl groups or less, or about 3 hydroxyl groups or less. The low molecular weight polyols used for the $S_c$ may contain any number of hydroxyl groups which ranges between any combination of these upper and lower values, inclusive, such as from at least 2 hydroxyl groups to about 8 hydroxyl groups or less, or greater than about 2 to about 6, or at least about 2.5 to about 3 hydroxyl groups or less.

Suitable low molecular weight polyols for the $S_c$ have a nominal functionality of greater than 2 to about 8 and an equivalent weight of about 28 to about 400.

Examples of suitable low molecular weight polyols include compounds such as, for example, glycerin, propylene glycol, dipropylene glycol, ethylene glycol, trimethylolpropane, sucrose, sorbitol, tripropylene glycol, and the like, and mixtures thereof. In one embodiment, the continuously added starter comprises propylene glycol and glycerin. Low molecular weight polyether polyols prepared by multiple epoxide addition to these polyols or other starters with two or more active hydrogens may also be employed as $S_c$.

The $S_c$ can also be other compounds having at least two active hydrogens per molecule, which are known to be suitable initiators for conventional DMC-catalyzed epoxide polymerizations, including compounds such as, for example, alcohols, thiols, aldehydes and ketones containing enolizable hydrogens, malonic esters, phenols, carboxylic acids and anhydrides, aromatic amines, acetylenes, and the like, and mixtures thereof. Examples of suitable active hydrogen-containing compounds appear in U.S. Pat. Nos. 3,900,518, 3,941,849, and 4,472,560, the disclosures of which are incorporated herein by reference.

The amount of $S_c$ used is at least about 25 mole percent of the total amount of starter used.

$$\text{mole \% } S_c = \left( \frac{\text{moles } S_c}{\text{moles } S_c + \text{moles } S_i} \right) \times 100$$

As described previously, a wide variety of epoxides can be employed in the current process. Propylene oxide and ethylene oxide are the most commonly used epoxides. A unique feature of the current process is that the compositions of the epoxide can be varied to control the composition of the polyether monol and polyether polyol constituents in the final product. For example, propylene oxide can be added alone during polymerization of the monol, prior to the start of the addition of the $S_c$, the continuously added starter. After $S_c$ addition is started, a blend of ethylene oxide and propylene oxide can be fed to yield a high functionality polyether polyol comprised of a poly(oxyethylene-oxypropylene) copolymer. Because oxide addition via DMC catalysis occurs predominantly on the lower equivalent weight polyether polyol, the polyether monol component can remain largely poly(oxypropylene). By reversing these sequences, the polyether monol could be produced with higher poly(oxyethylene) content and the polyether polyol could be predominantly poly(oxypropylene).

The epoxide composition may also be varied during the initial polymerization of the monol and/or at some point during and/or after the addition of $S_c$. This provides flexibility for controlling the distribution of oxyethylene or oxypropylene within the monofunctional polyether and polyether polyols and allows some control of the primary versus secondary hydroxyl functionality of the monofunctional polyether and polyether polyols, and thus, the relative reactivity of the constituents in the final composition. In this way, it is possible to design the product to meet the reactivity and performance requirements of the intended applications such as viscoelastic polyurethane foams.

The in-situ formed polyol blend (2)(a) essentially corresponds to the polyol blend (2)(a) described herein above, and is characterized by the same overall hydroxyl numbers and average functionalities.

As previously described, the in-situ formed polyol blends (2)(a) comprise (i) one or more monofunctional polyols having a hydroxyl number of less than or equal to 56 and containing less than or equal to 20% by weight of copolymerized oxyethylene, (ii) one or more polyether polyols having a hydroxyl number of from 47 to 300, a nominal functionality of 2, and containing from about 5 to about 45% by weight of copolymerized oxyethylene, and (iii) one or more polyether polyols having a hydroxyl number of about 47 to about 300, a nominal functionality of greater than 2 to about 6, and containing from about 5 to about 45% by weight of copolymerized oxyethylene. These individual components (i), (ii) and (iii) of the in-situ formed polyol blend correspond essentially to the individual components (i), (ii) and (iii) of the polyol blend (2)(a) described previously with respect to hydroxyl number, nominal functionality and content of copolymerized oxyethylene.

Suitable polyether polyols to be used as component (II)(b) which may optionally be combined with the in-situ prepared polyol blend may have an average functionality of 2 to 8, a hydroxyl number of 20 to 300 and comprise at least 50% of copolymerized oxyethylene, based on 100% by weight of the polyether polyol (II)(b).

These polyether polyols (b) suitable for the in-situ formed blend correspond essentially to those polyether polyols (2)(b) which are suitable for adding to the polyol blend (a) above and are previously described with respect to the hydroxyl number, average functionality and content of copolymerized oxyethylene.

In one embodiment, the in-situ formed polyol blends (a) may additionally comprise (II)(c) one or more polyether polyols having an OH number of from about 10 to about 300 and an average functionality of about 2 to about 8, and/or (d) one or more filled polyols. The one or more polyether polyols (c) and one or more filled polyols (d) suitable herein correspond essentially to those polyether polyols (c) and filled polyols (d) described previously with respect to the polyol blends (a) in terms of hydroxyl number, functionality, etc.

Suitable hydroxyl-terminated prepolymers to be used as component (3) herein comprise the reaction product of: (a) a diisocyanate and/or a polyisocyanate component, with (b) an isocyanate-reactive component comprising: (i) a polyether polyol having a nominal functionality of about 3, and a hydroxyl number ranging from 100 to 200, or (ii) castor oil, wherein the equivalent ratio of (3)(b) the isocyanate-reactive component to (3)(a) the diisocyanate and/or polyisocyanate component (a) ranges from 5:1 to 10:1, or preferably from 5:1 to 6:1.

Suitable diisocyanates and/or polyisocyanates to be used as component (a) of the hydroxyl-terminated prepolymers include, for example, aromatic, aliphatic, and cycloaliphatic di- and polyisocyanates. Examples include toluene diisocyanates (TDI), diphenylmethane diisocyanates (MDI), naphthalene diisocyanates, isophorone diisocyanate, hexamethylene diisocyanates (HDI), polymeric MDIs, and polyisocyanates modified with carbodiimide, ester, urea, urethane, allophanate, isocyanurate, biuret, or other functionalities, and the like, and mixtures thereof. Preferred polyisocyanates are TDI (usually a mixture of 2,4- and 2,6-isomers), MDIs, and mixtures of these. In one embodiment, the preferred polymeric diphenylmethane diisocyanates have a monomeric MDI content of greater than 45% by weight, or preferably of at least 60% by weight, or more preferably of at least 70% by weight. Isocyanate components which have a higher monomeric isocyanate content typically form hydroxyl-terminated prepolymers having lower viscosities.

The isocyanate-reactive component (b) of the hydroxyl-terminated prepolymer (3) comprises (i) a polyether polyol having a nominal functionality of about 3, and a hydroxyl number ranging from 100 to 200, or (ii) castor oil; wherein the equivalent ratio of (3)(b) the isocyanate-reactive component to (3)(a) the diisocyanate and/or polyisocyanate component (a) ranges from 5:1 to 10:1, or preferably from 5:1 to 6:1.

The polyether polyols (i) are typically made by reacting a compound having three active hydrogens as the starter with one or more epoxides. Suitable compounds having three active hydrogens include compounds such as glycerin, trimethylol propane, triethanolamine, etc., and mixtures thereof. Suitable epoxides include, for example, ethylene oxide, propylene oxide, butylene oxides, styrene oxide, epichlorihydrin or the like, or mixtures thereof. The epoxide can be polymerized using well-known techniques and a variety of catalysts, including alkali metals, alkali metal hydroxides and alkoxides, double metal cyanide complexes, and many others. These polyether polyols (i) are typically prepared with 100% propylene oxide. In one embodiment, the epoxides used to prepare the polyether polyols (i) comprise a mixture of EO and PO in a weight ratio of 0:100 to 50:50, or a mixture of EO and PO in a weight ratio of 0:100 to 30:70. Thus, these polyether polyols may be PO homopolymers, block EO-PO copolymers, random EO/PO copolymers, etc.

The isocyanate-reactive component used to prepare the hydroxyl-terminated prepolymers may also comprise (ii) castor oil.

The hydroxyl-terminated prepolymers of the invention which comprise the reaction product of (a) a diisocyanate and/or polyisocyanate component and (b) an isocyanate-reactive component comprising (i) a polyether polyol having a nominal functionality of about 3, and a hydroxyl number ranging from 100 to 200 typically have a viscosity of less than or equal to 2500 mPa·s at 25° C., or preferably of less than or equal to about 2000 mPa·s at 25° C., as measured using an Anton Paar SVM 3000/G2 Stabinger Viscometer.

The process for the production of a viscoelastic polyurethane foam comprises reacting (1) an isocyanate-functional component comprising a diisocyanate and/or a polyisocyanate component, (2) an isocyanate-reactive component, and (3) a hydroxyl-terminated prepolymer, in the presence of components comprising (4) a blowing agent, (5) a catalyst, and (6) a surfactant, wherein the isocyanate-functional component and the isocyanate-reactive component are reacted at an isocyanate index of 95 to 110. Suitable isocyanate-reactive components (2) comprise: (a) from 20 to 100% by weight, based on 100% by weight of components (a) and (b), of a polyol blend having a hydroxyl number of from about 56 to about 250, an average functionality greater than about 2 and comprising: (i) one or more monofunctional polyethers having a hydroxyl number of less than or equal to 56, and containing less than 20% by weight of copolymerized oxyethylene, based on the total weight of (a)(i); (ii) one or more polyether polyols having a hydroxyl number of about 47 to about 300, a nominal functionality of 2, and containing from about 5 to about 45% by weight of copolymerized oxyethylene, based on the total weight of (a)(ii); and (iii) one or more polyether polyols having a hydroxyl number of from 47 to 300, a nominal functionality of greater than 2 to 8, and containing from 5 to 45% of copolymerized oxyethylene, based on the total weight of the polyether polyol (iii); wherein (a) the polyol blend comprises 20 to 50% by weight of (i) one or more monofunctional polyethers and the balance of (a) comprises components (ii) and (iii) in which from 10 to 90% by weight of the balance comprises component (ii) and from 90 to 10% by weight of the balance comprises component (iii); and, optionally (b) up to 80% by weight, based on 100% by weight of component (a) and component (b), of one or more polyether polyols having an average functionality of 2 to 8, a hydroxyl number of 20 to 300 and comprising at least 50% of copolymerized oxyethylene, based on 100% by weight of component (b).

The viscoelastic flexible polyurethane foams of the invention are characterized by a 90% compression set of about 10% or less, or of about 5% or less, or of about 2.5% or less; and a 25% IFD value of at least about 9 lbf. Thus, the viscoelastic flexible polyurethane foams herein may be characterized by a 90% compression set of about 10% or less and a 25% IFD value of at least 9 lbf, or by a 90% compression set of about 5% or less and a 25% IFD value of at least 9 lbf, or a 90% compression set of about 2.5% or less and a 25% IFD value of at least 9 lbf. In one embodiment, the viscoelastic flexible polyurethane foams have the low 90% compression sets and 25% IFD value as described above while maintaining a relatively low $T_g$ and a ratio of the storage modulus at 15° C. to the storage modulus 30° C. of less than or equal to 5. As used herein, low $T_g$ means that the foams will have a $T_g$ of less than 20° C. as measured by tan delta.

The viscoelastic flexible polyurethane foams of the invention will preferably have a ratio of the storage modulus at 15° C. to the storage modulus 30° C. of less than or equal to 5, or less than or equal to 4, or less than or equal to 3. The ratio of the storage modulus at 15° C. to the storage modulus at 30° C. will also typically be greater than or equal to 1, or greater than or equal to 1.1, or greater than or equal to 1.2. Thus, the resultant viscoelastic flexible foams will typically have a ratio of the storage modulus at 15° C. to the storage modulus at 30° C. ranging between any combination of these upper and lower values, inclusive, such as of less than or equal to 5 to greater than or equal to 1, or less than or equal to 4 to greater than or equal to 1.1, or less than or equal to 3 to greater than or equal to 1.2. The storage modulus ratio is calculated by dividing the value of the storage modulus at 15° C. by the value of the storage modulus at 30° C.

In addition, the resultant viscoelastic polyurethane foam will preferably have a $T_g$ of less than 20° C., or of less than 18° C., or of less than or equal to 17° C. In another embodiment, when the isocyanate-reactive component (2) additionally comprises (b) a polyether polyol having an average functionality of 2 to 8, a hydroxyl number of 20 to 300 and which comprises at least 50% by weight of copolymerized oxyethylene, based on the total weight of the polyether polyol (2)(b), the resultant viscoelastic polyurethane foam will have a Tg of less than 16° C., or of less than 15° C., as measured by tan delta.

The viscoelastic flexible polyurethane foams herein have a density in the range of from about 1.0 lb/ft$^3$ to about 6.0 lb/ft$^3$, preferably 2.0 lb/ft$^3$ to 5.0 lb/ft$^3$.

The isocyanate index used to prepare the viscoelastic polyurethane foams herein ranges from greater than 95 to about 110.

In addition, in the process of preparing the viscoelastic flexible polyurethane foam, the isocyanate-reactive component (2) may additionally comprise at least one of: (2)(c) one or more polyether polyols having an OH number of from about 10 to about 300, an average functionality of from about 2 to about 8, and containing from 0 to 45% by weight of copolymerized oxyethylene, based on 100% by weight of component (2)(c); and/or (2)(d) one or more filled polyols. Suitable polyether polyols (2)(c) and filled polyols (2)(d) for the process essentially correspond to those described previously with respect to the isocyanate-reactive compositions.

Suitable isocyanate-functional compounds comprise toluene diisocyanate (TDI, which is usually a mixture of 2,4- and 2,6-isomers), and various mixtures thereof.

In one embodiment, a foam modifier or foam processing aid is added to the formulation to enhance processing and help stabilize the viscoelastic flexible foam against cold flow and/or dishing by providing dimensional stability against deformation and reduced settling of the viscoelastic flexible foam. These processing aids or modifiers are typically chain extenders and/or cross-linking agents. In general, chain extenders and/or cross-linking agents are relatively small molecules which contain from 2 to 8 active hydrogen groups. The chain extenders and/or cross-linking agents may contain at least 2 active hydrogen groups, or at least 3 active hydrogen groups. Chain extenders and/or cross-linking agents may also contain less than or equal to 8 active hydrogen groups, or less than or equal to 6 active hydrogen groups. Suitable chain extenders and/or cross-linking agents may contain any number of active hydrogen groups in any combination ranging between these upper and lower values, inclusive, such as at least 2 to less than or equal to 8 active hydrogen groups, or at least 3 to less than or equal to 6 active hydrogen groups. Suitable chain extenders and/or cross-linking agents are added in amounts of from 0 to 4 parts per hundred parts of polyol. Some examples of suitable chain extenders and/or cross-linking agents that may be included in the reaction mixture of the invention include diethanolamine (DEOA), ethylene glycol (EG), diethylene glycol (DEG), propylene glycol (PG), dipropylene glycol (DPG), 1,4-butanediol (BDO), Arcol DP1022, Ortegol 204, Geolite 206 and Geolite 210. Some of these aids are described in, for example, U.S. Pat. Nos. 4,950,694 and 5,539,011, the disclosures of which are hereby incorporated by reference. Processing additives are particularly useful in accordance with the invention when TDI is used as the isocyanate component. These chain extenders and/or cross-linking agents may be present in amount of 0 parts or higher, or of 0.3 parts or higher, per hundred parts of polyol. The chain extenders and/or crosslinking agents may also be present in amounts of 4 parts or less, or of 2 parts or less, per hundred parts of polyol. The amount of chain extenders and/or crosslinking agent present may range between any combination of these upper and lower values, inclusive, such as from 0 to 4 parts, or from 0.3 to 2 parts per hundred parts polyol. It may also be beneficial at times to use a combination of these different foam modifiers or processing aids.

In addition, the foam modifiers or processing aids may have an OH number of at least 300, or of at least 600.

Suitable blowing agents (4) for the present invention include, for example chemical blowing agents, i.e. isocyanate reactive agents that generate blowing gases, such as for example water and formic acid and physical blowing agents such as acetone, carbon dioxide, chlorofluorocarbons, highly fluorinated and/or perfluorinated hydrocarbons, chlorinated hydrocarbons, aliphatic and/or cycloaliphatic hydrocarbons such as propane, butane, pentane, hexane, etc., or acetals such as methylal. These physical blowing agents are usually added to the polyol component of the system. However, they can also be added in the isocyanate component or as a combination of both the polyol component and the isocyanate component. It is also possible to use them together with highly fluorinated and/or perfluorinated hydrocarbons, in the form of an emulsion of the polyol component. If emulsifiers are used, they are usually oligomeric acrylates which contain polyoxyalkylene and fluoroalkane radicals bonded as side groups and have a fluorine content of from about 5 to 30% by weight. Such products are sufficiently well known from plastics chemistry, and are described in U.S. Pat. No. 4,972,002, the disclosure of which is herein incorporated by reference.

The amount of blowing agent or blowing agent mixture used may range from 0.5 to 20% by weight, based on 100% by weight of components (2) and (3). As used herein with respect to the amount of blowing agent, the isocyanate-reactive components include both (2) the isocyanate-reactive component and (3) the hydroxyl-terminated prepolymer (3) as described herein above. In some instances, the amount of blowing agent present may be at least 0.5% or at least 0.75% by weight, based on 100% by weight of components (2) and (3). The amount of blowing agent present may also be about 20% or less, or about 10% by weight or less, based on 100% by weight of components (2) and (3). The blowing agent may be present in any amount ranging between any combination of these upper and lower above values, inclusive, such as from at least about 0.5% to about 20% or less, or from at least about 0.75% to about 10% by weight or less, based on 100% by weight of components (2) and (3).

When water is the blowing agent, the amount of water typically present can range from at least about 0.5 to about 10%, based on 100% by weight of components (2) and (3). In some instances, the amount of blowing agent present may be at least 0.5% or at least 0.75% by weight, based on 100% by weight of components (2) and (3). The amount of water present as a blowing agent may also be about 10% or less, or about 7% by weight or less, based on 100% by weight of components (2) and (3). The blowing agent may be present in any amount ranging between any combination of these upper and lower values, inclusive, such as from at least about 0.5% to about 10% or less, or from at least about 0.75% to about 7% by weight or less, based on 100% by weight of components (2) and (3). The addition of water can be effected in combination with the use of the other blowing agents described. In accordance with the present invention, water is the preferred blowing agent. Also, preferred is the use of water along with pressurized carbon dioxide that is dispersed in the polyol or resin blend and frothed by passing through a pressure let down device such as employed for example in the Henecke Novaflex, CarDio (Cannon Viking Limited) and Beamech ($CO_2$) machines, which are known by those skilled in the art.

The viscoelastic flexible foam is produced in the presence of a surfactant, which helps to stabilize the viscoelastic flexible foam until it cures. Suitable surfactants are those well known in the polyurethane industry. A wide variety of organosilicone surfactants are commercially available. Examples of suitable surfactants are Niax L-620 surfactant, a product of Momentive Performance Materials, and Tegostab B8244, a product of Evonik-Goldschmidt. Many other silicone surfactants known to those in the art may be substituted for these suitable silicones. The surfactant is typically used in an amount within the range of from at least about 0.1 to about 4 parts, based on 100% by weight of components (2) and (3). The surfactant may be present in amounts ranging from at least about 0.1, or from at least about 0.2 parts, based on 100% by weight of components (2) and (3).

The surfactant may be also present in amounts ranging from about 4 parts or less, or from about 3 parts or less, based on 100% by weight of components (2) and (3). The amount of surfactant may range between any combination of these upper and lower values, inclusive, such as from at least about 0.1 to about 4 parts, or from at least about 0.2 to about 3 parts, based on 100% by weight of components (2) and (3).

At least one polyurethane catalyst is required to catalyze the reactions of the isocyanate-reactive components and water with the polyisocyanate. It is common to use both an organoamine and an organotin compound for this purpose. Suitable polyurethane catalysts are well known in the art; an extensive list appears in U.S. Pat. No. 5,011,908, the disclosure of which is herein incorporated by reference. Suitable organotin catalysts include tin salts and dialkyltin salts of carboxylic acids. Examples include stannous octoate, dibutyltin dilaurate, dibutyltin diacetate, stannous oleate, and the like. Stannous octoate is particularly preferred. Preferred organoamine catalysts are tertiary amines such as trimethylamine, triethylamine, triethylenediamine, bis(2,2'-dimethyl-amino)ethyl ether, N-ethylmorpholine, diethylenetriamine, and the like.

In another embodiment, suitable amine catalysts include non-emissive balanced amines which bind chemically into the polyurethane foam matrix and eliminate contributions to odor and VOC emissions or is of high enough molecular weight so as not to contribute to VOC emissions. These are also referred to as non-fugitive amine catalysts.

Examples of these catalysts include Dabco NE-300 and Dabco NE-500 from Air products, N,N-bis(3-dimethylaminopropyl)-N-isopropanolamine (commercially available as Jeffcat ZR 50), N-(3-dimethylaminopropyl)-N,N-diisopropanolamine (commercially available as Jeffcat DPA), 1,4-diazabicyclo[2.2.2]octane-2-methanol (commercially available as RZETA) from TOSOH Corporation.

The polyurethane catalysts are typically used in an amount within the range of about 0.01 to about 3 parts, based on 100% by weight of components (2) and (3). The polyurethane catalysts may be present in amounts of from at least about 0.01, or from at least about 0.1 parts, based on 100% by weight of components (2) and (3). The polyurethane catalysts may be present in amounts of about 3 parts or less, or of about 2 parts or less based on 100% by weight of components (2) and (3). The polyurethane catalysts may be present in any amount ranging between any combination of these upper and lower values, inclusive, such as from at least about 0.01 to about 3 parts, or from at least about 0.1 to about 2 parts, based on 100% by weight of components (2) and (3).

Flame retardants, antioxidants, pigments, dyes, liquid and solid fillers, and many other commercial additives can also be included in the viscoelastic flexible foams in conventional amounts.

The viscoelastic flexible foams are prepared using methods that are well known in the industry. These methods may include continuous or discontinuous free-rise slabstock foam processes and molded foam processes. In a typical slabstock process, the isocyanate is continuously mixed together with the other formulation chemicals by passing through a mixing head and then into a trough which overflows onto a moving conveyor.

Alternatively, the reacting mixture is deposited directly onto the moving conveyor. In another embodiment, high pressure liquid carbon dioxide is fed into one or more of the formulation components, typically the polyol, entering into the mixing head and the resin blend is passed through a frothing device where the pressure is let down and the resultant froth is deposited onto the conveyor. The viscoelastic flexible foam expands and rises as it moves down the conveyor to form a continuous foam slab that is cut into blocks or buns of the desired length for curing and storage. After curing for one or more days, these foam buns can be cut into the desired shapes for the end-use applications. In the discontinuous process, the reactants are quickly mixed together through a head or in a large mixing chamber. The reaction mixture is then deposited into a large box or other suitable container where foam expansion occurs to form a bun of the lateral dimensions of the container.

A typical molded viscoelastic flexible foam process usually employs a one-shot approach in which a specific amount of the isocyanate stream (the "A" side) is rapidly combined and mixed with a specific amount of the remaining formulation components (the "B" side). An additional stream may be employed to bring in one or more specific components not included with the "B" side stream. The mixture is quickly deposited into a mold that is then closed. The viscoelastic flexible foam expands to fill the mold and produce a part with the shape and dimensions of the mold.

Although less preferred, an isocyanate-terminated prepolymer approach to making the viscoelastic flexible foams can also be used. In this approach, a significant portion of the isocyanate-reactive mixture is reacted with the polyisocyanate, and the resulting isocyanate-terminated prepolymer is then reacted with the remaining components.

As used and referred to throughout the specification, air flow was measured in accordance with the NOPCO test procedure described by R. E. Jones and G. Fesman, "Journal of Cellular Plastics," January, 1965, Vol. No. 1, pp. 200-216, the disclosure of which is herein incorporated by reference, using a Amscor Model 1377 automated foam porosity tester. A 2 inch×2 inch×1 inch piece of foam was cut from near the center of the test specimens which itself was cut from the foam blocks after production. Air flow, expressed as standard cubic feet per minute (i.e. scfpm), was measured through the 1 inch thickness at a pressure differential of 0.5 inches of water less than atmospheric pressure. The air flow was in the direction of rise of the foam.

The test used to define foam recovery rate from deformation is the 95% height recovery time as described in ASTM D 3574-11 Test M. A recovery rate of less than about 3 seconds, indicates a fast recovering foam such as observed for resilient foam types. A recovery rate of greater than or equal to about 3 seconds is indicative of a slow recovery foam often referred to as "viscoelastic" or "memory" foam.

Other viscoelastic flexible foam physical properties reported in the examples were measured per the standard procedures described in ASTM D3574-11.

Commercial production of viscoelastic flexible foams involves mixing together a suitable polyisocyanate, a blowing agent, and an isocyanate-reactive component or mixture in the presence of a surfactant, one or more catalysts, and various other compounds which are known in the field of polyurethane chemistry to be suitable for preparing viscoelastic flexible foams. Other isocyanate-reactive compounds (2) to be used in addition to the above described polyol blends which comprise (2)(a) the polyol blend and (2)(b) the polyether polyol having an average functionality of 2 to 8, a hydroxyl number of 20 to 300 and comprising at least 50% by weight of copolymerized oxyethylene, based on the total weight of the polyether polyol, include other conventional polyols which are well known in the field of polyurethane chemistry. These include the relatively high molecular weight compounds such as, for example, polyether polyols, polyester polyols, polymer polyols, amine-terminated polyethers, polythioethers, polyacetals and polycarbonates, as well as various low molecular weight chain extenders and/or crosslinking agents both of which may contain hydroxyl groups and/or amine groups capable of reacting with the isocyanate groups of the isocyanate component.

In addition, the isocyanate-reactive component (2) to be used in the viscoelastic polyurethane foams herein may additionally comprise at least one of (2)(c) one or more polyether polyol having an OH number of from about 10 to about 300, an average functionality of from about 2 to about 8, and which contain from 0 to 45% by weight of copolymerized oxyethylene, based on 100% by weight of component (2)(c); and/or (2)(d) one or more filled polyols which are also commonly referred to as polymer polyols.

The glass transition temperatures ($T_g$) as measured by tan delta of various viscoelastic polyurethane foams was determined as described herein by Dynamic Mechanical Analysis. The tan delta is the ratio of the loss modulus to the storage modulus (a measure of the energy dissipation of a material) and, when measured over a range of temperatures, tan delta is generally an indicator of the viscoelasticity of the polyurethane foam at those temperatures. The DMA method described herein should be used to determine the tan delta response and the $T_g$ (peak tan delta value) of viscoelastic flexible foams according to the claimed invention. Since viscoelastic polyurethane foam is made up of various internal hard and soft domains, the $T_g$ is not as definitive a number as with some other materials. As a result, there are various ways to measure and determine $T_g$ when evaluating DMA (Dynamic Mechanical Analysis) results. The results can be affected by the protocols used in running the DMA test. The DMA testing herein was performed using the following protocol:

Dynamic Mechanical Analysis (DMA) of foam samples was performed using a TA Instruments Q800 DMA with an 8 mm dual cantilever fixture. The sample dimensions were typically 12.7 mm×40 mm×3 mm. There is an equilibration period at −100° C. which allowed the foam samples and equipment to stabilize before the temperature ramp. The foam samples were evaluated from −100° C. to 100° C. using a 1° C./minute ramp rate. The samples were subjected to a 20 μm oscillating deflection at a frequency of 1 Hz.

Evaluation of storage modulus in the 15° C. to 30° C. range, and particularly the ratio of storage modulus at 15° C. to 30° C., provides a good indication of the temperature sensitivity of the foam, with a higher ratio indicating a greater rate of property change. Consideration of only the $T_g$ (measured as the peak on the tan delta curve or any other single point measurement) of a foam does not accurately address the temperature sensitivity of a foam at its typical use temperature. Thus, to accurately evaluate the overall performance of a foam, it is recommended to consider both the $T_g$ and the ratio of storage modulus at 15° C. to 30° C.

In a first embodiment, the invention is directed to a process for preparing a viscoelastic flexible polyurethane foam comprising reacting: (1) a diisocyanate and/or a polyisocyanate, with (2) an isocyanate-reactive component comprising: (a) from 20 to 100% by weight, based on 100% by weight of components (2)(a) and (2)(b), of a polyol blend having a hydroxyl number of from 56 mg KOH/g polyol to about 250 mg KOH/g polyol, an average functionality of greater than 2, and comprising: (i) a monofunctional polyether having a hydroxyl number of less than or equal to 56 mg KOH/g polyol, and containing less than or equal to 20% of copolymerized oxyethylene, based on the total weight of the monofunctional polyether (a)(i); (ii) a polyether polyol having a hydroxyl number of from 47 mg KOH/g polyol to 300 mg KOH/g polyol, a nominal functionality of 2, and containing from 5 to 45% of copolymerized oxyethylene, based on the total weight of the polyether polyol (a)(ii); and (iii) a polyether polyol having a hydroxyl number of from 47 mg KOH/g polyol to 300 mg KOH/g polyol, a nominal functionality of greater than 2 to 8, and containing from 5 to 45% of copolymerized oxyethylene, based on the total weight of the polyether polyol (a)(iii); wherein (a) the polyol blend comprises 20 to 50% by weight of (i) the monofunctional polyether and the balance comprises components (ii) and (iii) in which from 10 to 90% by weight of the balance comprises component (ii) and from 90 to 10% by weight of the balance comprises component (iii); and, optionally, (b) up to 80% by weight, based on 100% by weight of components (2)(a) and (2)(b), of a polyether polyol having an average functionality of from 2 to 8, a hydroxyl number of from 20 mg KOH/g polyol to 300 mg KOH/g polyol and containing at least 50% of copolymerized oxyethylene, based on the total weight of the polyether polyol (2)(b); and (3) a hydroxyl-terminated prepolymer comprising the reaction product of (a) a diisocyanate and/or polyisocyanate component, with (b) an isocyanate-reactive component comprising (i) a polyether polyol having a nominal functionality of about 3 and a hydroxyl number ranging from 100 to 200, or (ii) castor oil, wherein the equivalent ratio of (3)(b) the isocyanate-reactive component to (3)(a) the diisocyanate and/or polyisocyanate component (a) ranges from 5:1 to 10:1; in the presence of (4) a blowing agent; (5) a catalyst; and (6) a surfactant.

In a second embodiment, the invention is directed to the process according to the first embodiment in which the hydroxyl-terminated prepolymer comprises the reaction product of (a) a diisocyanate and/or a polyisocyanate component, with (b) an isocyanate-reactive component comprising (i) a polyether polyol having a nominal functionality of about 3, a hydroxyl number ranging from 100 to 200, in which the hydroxyl-terminated prepolymer has a viscosity of less than 2500 mPa·s@25° C., preferably less than 2000 mPa·s@25° C.

In a third embodiment, the invention is directed to the process according to the first or second embodiments wherein the hydroxyl-terminated prepolymer is prepared at an equivalent ratio of (3)(b) the isocyanate-reactive component to (3)(a) the diisocyanate and/or polyisocyanate component (a) in the range from 5:1 to 6:1.

In a fourth embodiment, the invention is directed to the process according to one of the first through the third embodiments wherein (3)(a) the polyisocyanate component of the hydroxyl-terminated prepolymer comprises a polymeric diphenylmethane diisocyanate having a monomeric MDI content of greater than 45% by weight, preferably of at least 60% by weight, more preferably of at least 70% by weight.

In a fifth embodiment, the invention is directed to the process according to one of the first through the fourth embodiments wherein (3)(b)(i) the polyether polyol comprises the reaction product of a starter compound with propylene oxide in the presence of a catalyst.

In a sixth embodiment, the invention is directed to the process according to one of the first through the fifth embodiments wherein (3)(b)(i) the polyether polyol comprises the reaction product of a starter compound with an alkylene oxide in the presence of a catalyst, wherein the alkylene oxide comprises a mixture of ethylene oxide and propylene oxide in a weight ratio of greater than 0:100 to 50:50.

In a seventh embodiment, the invention is directed to the process according to one of the first through the sixth embodiments wherein (2)(a) the polyol blend has a hydroxyl number of from 70 mg KOH/g polyol to less than 120 mg KOH/g polyol and an average functionality of at least 2.1.

In an eighth embodiment, the invention is directed to the process according to one of the first through the seventh embodiments wherein the resultant viscoelastic flexible polyurethane foam has a 90% compression set of about 10% or less and a 25% IFD value of at least 9 lbf, as measured by ASTM D-3574-11.

In a ninth embodiment, the invention is directed to the process according to the eighth embodiment wherein the resultant viscoelastic flexible polyurethane foam has a 90% compression set of about 5% or less, preferably of about 2.5% or less, as measured by ASTM D-3574-11.

In a tenth embodiment, the invention is directed to the process according to one of the eighth or the ninth embodiments wherein the resultant viscoelastic flexible polyurethane foam additionally has a ratio of storage modulus at 15° C. to the storage modulus at 30° C. of less than or equal to 5 and greater than or equal to 1, and a $T_g$ of less than 20° C. as measured by tan delta.

In an eleventh embodiment, the invention is directed to the process according to one of the eighth or the ninth embodiments wherein the resultant viscoelastic flexible polyurethane foam additionally has a ratio of storage modulus at 15° C. to the storage modulus at 30° C. of less than or equal to 4 and greater than or equal to 1.1, and a $T_g$ of less than 18° C. as measured by tan delta.

In a twelfth embodiment, the invention is directed to the process according to one of the eighth or the ninth embodiments wherein the resultant viscoelastic flexible polyurethane foam additionally has a ratio of storage modulus at 15° C. to the storage modulus at 30° C. of less than or equal to 3 and greater than or equal to 1.2, and a $T_g$ of less than or equal to 17° C. as measured by tan delta.

In a thirteenth embodiment, the invention is directed to the process according to one of the eighth or the ninth embodiments, wherein (2) the isocyanate-reactive component additionally comprises greater than 0% by weight of (b) a polyether polyol having an average functionality of 2 to 8, a hydroxyl number of 20 to 300 and which comprise at least 50% by weight of copolymerized oxyethylene, based on the total weight of the polyether polyol (2)(b), in which the resultant viscoelastic flexible polyurethane foam additionally has a ratio of storage modulus at 15° C. to the storage modulus at 30° C. of less than or equal to 3 and greater than or equal to 1.2, and a $T_g$ of less than to 16° C. as measured by tan delta.

In a fourteenth embodiment, the invention is directed to the process according to one of the eighth or the ninth embodiments, wherein (2) the isocyanate-reactive component additionally comprises greater than 0% by weight of (b) a polyether polyol having an average functionality of 2 to 8, a hydroxyl number of 20 to 300 and which comprise at least 50% by weight of copolymerized oxyethylene, based on the total weight of the polyether polyol (2)(b), in which the resultant viscoelastic flexible polyurethane foam additionally has a ratio of storage modulus at 15° C. to the storage modulus at 30° C. of less than or equal to 3 and greater than or equal to 1.2, and a $T_g$ of less than to 15° C. as measured by tan delta.

In a fifteenth embodiment, the invention is directed to the process according to one of the first through the fourteenth embodiments wherein (2) the isocyanate-reactive component additionally comprises at least one of: (c) a polyether polyol having a hydroxyl number of from 10 mg KOH/g polyol to 300 mg KOH/g polyol, an average functionality of from 2 to 8, and which contains from 0 to 45% by weight of copolymerized oxyethylene, based on 100% by weight of component (c), wherein polyether polyol (c) is different than polyether polyols (a)(ii) and (a)(iii); and/or (d) a filled polyol.

In a sixteenth embodiment, the invention is directed to the process according to one of the first through the fifteenth embodiments wherein (2)(a) the polyol blend comprises an in-situ formed polyol blend.

In a seventeenth embodiment, the invention is directed to a viscolelastic flexible polyurethane foam which comprises the reaction product of (1) a diisocyanate or polyisocyanate component, with (2) an isocyanate-reactive component comprising: (a) from 20 to 100% by weight, based on 100% by weight of components (2)(a) and (2)(b), of a polyol blend having a hydroxyl number of from 56 mg KOH/g polyol to about 250 mg KOH/g polyol, an average functionality of greater than 2, and comprising: (i) a a monofunctional polyether having a hydroxyl number of less than or equal to 56 mg KOH/g polyol, and containing less than or equal to 20% of copolymerized oxyethylene, based on the total weight of said monofunctional polyether (a)(i); (ii) a polyether polyol having a hydroxyl number of from 47 mg KOH/g polyol to 300 mg KOH/g polyol, a nominal functionality of 2, and containing from 5 to 45% of copolymerized oxyethylene, based on the total weight of said polyether polyol (a)(ii); and (iii) a polyether polyol having a hydroxyl number of from 47 mg KOH/g polyol to 300 mg KOH/g polyol, a nominal functionality of greater than 2 to 8, and containing from 5 to 45% of copolymerized oxyethylene, based on the total weight of said polyether polyol (a)(iii); wherein (a) the polyol blend comprises 20 to 50% by weight of (i) said monofunctional polyether and the balance comprises components (ii) and (iii) in which from 10 to 90% by weight of the balance comprises component (ii) and from 90 to 10% by weight of the balance comprises component (iii); and, optionally, (b) up to 80% by weight, based on 100% by weight of components (2)(a) and (2)(b), of a polyether polyol having an average functionality of from 2 to 8, a hydroxyl number of from 20 mg KOH/g polyol to 300 mg KOH/g polyol and containing at least 50% of copolymerized oxyethylene, based on the total weight of the polyether polyol (2)(b); and (3) a hydroxyl-terminated prepolymer comprising the reaction product of: (a) a diisocyanate and/or a polyisocyanate component, with (b) an isocyanate-reactive component comprising: (i) a polyether polyol having a nominal functionality of about 3, and a hydroxyl number of from 100 to 200, or (ii) castor oil, wherein the equivalent ratio of (3)(b) said isocyanate-reactive component to (3)(a) the diisocyanate and/or polyisocyanate component (a) ranges from 5:1 to 10:1; in the presence of (4) a blowing agent; (5) a catalyst; and (6) a surfactant.

In an eighteenth embodiment, the invention relates to the viscoelastic flexible polyurethane foam according to the seventeenth embodiment wherein (3) the hydroxyl-terminated prepolymer comprises the reaction product of: (a) a diisocyanate and/or a polyisocyanate component, with (b) an isocyanate-reactive component comprising: (i) a polyether polyol having a nominal functionality of about 3, and a hydroxyl number ranging from 100 to 200, and the hydroxyl-terminated prepolymer has a viscosity of less than 2500 mPa·s@25° C., preferably of less than 2000 mPa·s@25° C.

In a nineteenth embodiment, the invention relates to the viscoelastic flexible polyurethane foam according to one of the seventeenth or eighteenth embodiments wherein the hydroxyl-terminated prepolymer is prepared at an equivalent ratio of (3)(b) the isocyanate-reactive component to (3)(a) the diisocyanate and/or polyisocyanate component (a) in the range from 5:1 to 6:1.

In an twentieth embodiment, the invention relates to the viscoelastic flexible polyurethane foam according to one of the seventeenth through the nineteenth embodiments wherein (3)(a) the polyisocyanate component of the hydroxyl-terminated prepolymer comprises a polymeric diphenylmethane diisocyanate having a monomeric MDI content of greater than 45% by weight, preferably of at least 60% by weight, more preferably of at least 70% by weight.

In a twenty-first embodiment, the invention relates to the viscoelastic flexible polyurethane foam according to one of the seventeenth through the twentieth embodiments wherein (3)(b)(i) the polyether polyol comprises the reaction product of a starter compound with propylene oxide in the presence of a catalyst.

In a twenty-second embodiment, the invention relates to the viscoelastic flexible polyurethane foam according to one of the seventeenth through the twenty-first embodiments wherein (3)(b)(i) the polyether polyol comprises the reaction product of a starter compound with an alkylene oxide in the presence of a catalyst, wherein said alkylene oxide comprises a mixture of ethylene oxide and propylene oxide in a weight ratio of greater than 0:100 to 50:50.

In a twenty-third embodiment, the invention relates to the viscoelastic flexible polyurethane foam according to one of the seventeenth through the twenty-second embodiments wherein (2)(a) said polyol blend has a hydroxyl number of from 70 mg KOH/g polyol to less than 120 mg KOH/g polyol and an average functionality of at least 2.1.

In a twenty-fourth embodiment, the invention relates to the viscoelastic flexible polyurethane foam according to one of the seventeenth through the twenty-third embodiments wherein the resultant viscoelastic flexible polyurethane foam has a 90% compression set of about 10% or less and a 25% IFD value of at least 9 lbf, as measured by ASTM D-3574-11.

In a twenty-fifth embodiment, the invention relates to the viscoelastic flexible polyurethane foam according to the twenty-fourth embodiment wherein the resultant viscoelastic flexible polyurethane foam has a 90% compression set of about 5% or less, preferably of about 2.5% or less, as measured by ASTM D-3574-11.

In a twenty-sixth embodiment, the invention relates to the viscoelastic flexible polyurethane foam according to one of the twenty-fourth or twenty-fifth embodiments wherein the viscoelastic flexible polyurethane foam additionally has a ratio of storage modulus at 15° C. to the storage modulus at 30° C. of less than or equal to 5 and greater than or equal to 1, and a $T_g$ of less than 20° C. as measured by tan delta.

In a twenty-seventh embodiment, the invention relates to the viscoelastic flexible polyurethane foam according to one of the twenty-fourth or the twenty-fifth embodiments wherein the viscoelastic flexible polyurethane foam additionally has a ratio of storage modulus at 15° C. to the storage modulus at 30° C. of less than or equal to 4 and greater than or equal to 1.1, and a $T_g$ of less than 18° C. as measured by tan delta.

In a twenty-eighth embodiment, the invention relates to the viscoelastic flexible polyurethane foam according to one of the twenty-fourth or the twenty-fifth embodiments wherein the viscoelastic flexible polyurethane foam additionally has a ratio of storage modulus at 15° C. to the storage modulus at 30° C. of less than or equal to 3 and greater than or equal to 1.2, and a $T_g$ of less than or equal to 17° C. as measured by tan delta.

In a twenty-ninth embodiment, the invention relates to the viscoelastic flexible polyurethane foam according to one of the twenty-fourth or the twenty-fifth embodiments wherein (2) the isocyanate-reactive component additionally comprises greater than 0% by weight of (b) a polyether polyol having an average functionality of 2 to 8, a hydroxyl number of 20 to 300 and which comprises at least 50% of copolymerized oxyethylene, based on the total weight of the polyether polyol (2)(b), in which the resultant viscoelastic flexible polyurethane foam additionally has a ratio of storage modulus at 15° C. to the storage modulus at 30° C. of less than or equal to 3 and greater than or equal to 1.2, and a $T_g$ of less than 16° C. as measured by tan delta.

In a thirtieth embodiment, the invention relates to the viscoelastic flexible polyurethane foam according to one of the twenty-fourth or the twenty-fifth embodiments wherein (2) the isocyanate-reactive component additionally comprises greater than 0% by weight of (b) a polyether polyol having an average functionality of 2 to 8, a hydroxyl number of 20 to 300 and which comprises at least 50% of copolymerized oxyethylene, based on the total weight of the polyether polyol (2)(b), in which the resultant viscoelastic flexible polyurethane foam additionally has a ratio of storage modulus at 15° C. to the storage modulus at 30° C. of less than or equal to 3 and greater than or equal to 1.2, and a $T_g$ of less than 15° C. as measured by tan delta.

In a thirty-first embodiment, the invention relates to the viscoelastic flexible polyurethane foam according to one of the seventeenth through the thirtieth embodiments wherein (2) the isocyanate-reactive component additionally comprises at least one of: (c) a polyether polyol having an hydroxyl number of from 10 mg KOH/g polyol to 300 mg KOH/g polyol, an average functionality of from 2 to 8, and which contains from 0 to 45% by weight of copolymerized oxyethylene, based on 100% by weight of component (c), wherein polyether polyol (c) is different than polyether polyols (a)(ii) and (a)(iii); and/or (d) a filled polyol.

In a thirty-second embodiment, the invention relates to the viscoelastic flexible polyurethane foam according to one of the seventeenth through the thirty-first embodiments wherein (2)(a) the polyol blend comprises an in-situ formed polyol blend.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Test Methods

Hydroxyl Numbers: The hydroxyl numbers were determined in accordance with ASTM D-4274-11, and are reported in mg KOH/g polyol.

Viscosity: The viscosities of the polyether polyols were determined at 25° C. using an Anton Paar SVM 3000/G2 Stabinger Viscometer.

Other foam physical properties reported herein were measured per the standard procedures described in ASTM D3574-11.

As used herein, "pphp" represents parts per hundred parts.

The following materials were used in the working examples:

Polyol A: An in-situ prepared multifunctional polyol prepared by alkoxylating a monol, diol, and triol with a DMC catalyst following the procedure described in U.S. Pat. No. 6,491,846, the disclosure of which is hereby incorporated by reference. The starter comprises a 1600 MW (35 OH #) monol made from the propoxylation of Neodol 25 and is alkoxylated with a mixture of propylene oxide and ethylene oxide in a weight ratio of 82/18 to a hydroxyl number of about 17.8 mg KOH/g polyol. At this point, a mixture of glycerin and propylene glycol in a weight ratio of 62.3% to 37.7% is continuously added along with mixture of propylene oxide and ethylene oxide in a weight ratio of 82/18 until a hydroxyl number of about 125 mg KOH/g polyol is reached. At this point, the propylene glycol and glycerin feeds are stopped, and propylene oxide and ethylene oxide are continuously added in a weight ratio of 55/45 until a nominal hydroxyl number of 100 mg KOH/g polyol is reached. The product had an overall functionality of about 2.4 and a nominal hydroxyl number of about 100 mg KOH/g polyol Polyol B: A glycerin started poly(oxypropyleneoxyethylene) polyol having a hydroxyl number of about 37 mg KOH/g polyol, and containing about 73% of copolymerized oxyethylene, which was prepared by KOH catalysis Polyol C: a glycerin/propylene glycol started poly(oxypropyleneoxyethylene) polyol having a hydroxyl number of about 56 mg KOH/g polyol, and containing about 8% of copolymerized oxyethylene, which was prepared by DMC catalysis Polyol D: A glycerin started poly(oxypropyleneoxyethyene) polyol having a hydroxyl number of about 56 mg KOH/g polyol, and containing about 9% of copolymerized oxyethylene, which was prepared by KOH catalysis Polyol E: A glycerin started poly(oxypropylene) polyol having a hydroxyl number of about 168 mg KOH/g polyol, and containing about 100% of polymerized oxypropylene, which was prepared by KOH catalysis Polyol F: A glycerin started poly(oxypropylene) polyol having a hydroxyl number of about 112 mg KOH/g polyol, and containing about 100% of polymerized oxypropylene, which was prepared by KOH catalysis Polyol G: A glycerin started poly(oxypropyleneoxyethylene) polyol having a hydroxyl number of about 140 mg KOH/g polyol, and containing about 25% of copolymerized oxyethylene, which was prepared by KOH catalysis Polyol H: A glycerin started poly(oxypropylene) polyol having a hydroxyl number of about 57 mg KOH/g polyol, and containing about 100% of polymerized oxypropylene, which was prepared by KOH catalysis Polyol I: A glycerin started poly(oxypropylene) polyol having a hydroxyl number of about 238 mg KOH/g polyol, and containing about 100% of polymerized oxypropylene, which was prepared by KOH catalysis Polyol J: A glycerin/propylene glycol started poly(oxypropylene) polyol having a hydroxyl number of about 238 mg KOH/g polyol, and containing about 100% of polymerized oxypropylene, which was prepared by DMC catalysis Polyol K: Castor Oil having an OH number of about 164 and a functionality of about 3

Foam Modifier A: A foam modifier having a hydroxyl number of about 1240 mg KOH/g polyol, commercially available from Momentive Performance Materials as Arcol DP-1022

Foam Modifier B: A delayed action crosslinking agent having a hydroxyl number of about 2420 mg KOH/g polyol, commercially available from Evonik Industries as Ortegol 204

Surfactant A: A silicone surfactant commercially available from Momentive Performance Materials as Niax L-618

Catalyst A: An amine catalyst, commercially available from Momentive Performance Materials as Niax A-33

Catalyst B: An amine catalyst, commercially available from Momentive Performance Materials as Niax A-1

Catalyst C: Tin octoate, commercially available from Evonik as Dabco T-9

Isocyanate A: toluene diisocyanate having 80% of 2,4-isomer and 20% of 2.6-isomer having an NCO content of 48.3%

Isocyanate B: a low functionality polymeric diphenylmethane diisocyanate (pMDI) with a viscosity of approximately 25 mPa·s@25° C., an NCO content of about 32.8% and a monomeric MDI content of at least 70% by weight Isocyanate C: a high functionality polymeric diphenylmethane diisocyanate (pMDI) with a viscosity of approximately 200 mPa·s@25° C., an NCO content of about 31.5%, and having a monomeric MDI content of less than 45% by weight Isocyanate D: a low functionality polymeric diphenylmethane diisocyanate (pMDI) rich in 2,4'-MDI with a viscosity of approximately 30 mPa·s@25° C., an NCO content of about 32.5%, and a monomeric MDI content of at least 70% by weight Isocyanate E: a medium functionality polymeric diphenylmethane diisocyanate (pMDI) rich in 2,4'-MDI with a viscosity of approximately 45 mPa·s@25° C., an NCO content of about 32%, and a monomeric MDI content of at least 60% by weight Isocyanate F: a high functionality polymeric diphenylmethane diisocyanate (pMDI) rich in 2,4'-MDI with a viscosity of approximately 180 mPa·s@25° C., an NCO content of about 31.6%, and a monomeric MDI content of greater than 45% by weight The hydroxyl-terminated prepolymers 1-15 (i.e. HTP1-HTP16) were prepared using the following procedure: The polyol was placed in a suitable vessel and warmed to 35° C., then the isocyanate was added, and the mixture was mixed for approximately 3 minutes while maintaining a nitrogen blanket over the reaction mixture. While mixing, the catalyst was added to promote the reaction. Mixing was continued for about 45 minutes, then the vessel was placed in an oven at 50° C. overnight. After allowing the mixture to cool, the product was stirred and the Brookfield viscosity at 25° C. was measured using an Anton Paar SVM 3000/G2 Stabinger Viscometer.

TABLE 1A

| Hydroxyl-Terminated Prepolymers (HTP) 1-6 | | | | | | |
|---|---|---|---|---|---|---|
| HTP Example | 1 | 2 | 3 | 4 | 5 | 6 |
| Isocyanate B* | 2.28 | 2.43 | 2.28 | 10.0 | 2.2 | 10.0 |
| Polyol C* | 100 | | | | | |
| Polyol H* | | 100 | | | | |
| Polyol I* | | | 100 | 100 | | |
| Polyol D* | | | | | 100 | |
| Polyol J* | | | | | | 100 |
| Catalyst A* | 0.1 | 0.1 | 0.1 | 0.1 | 0.1 | 0.1 |
| Theo. OH # (mg KOH/g polyol) | 45 | 46 | 223 | 177 | 42 | 177 |
| OH:NCO Molar Ratio | 5.47:1 | 5.45:1 | 23.84:1 | 5.45:1 | 5.45:1 | 5.45:1 |
| Viscosity (mPa·s @ 25° C.) | 1930 | 1829 | 453 | 4034 | 1744 | 3802 |

*pbw

TABLE 1B

| Hydroxyl-Terminated Prepolymers (HTP) 7-12 | | | | | | |
|---|---|---|---|---|---|---|
| HTP Example | 7 | 8 | 9 | 10 | 11 | 12 |
| Isocyanate B* | 7.05 | 2.28 | 2.28 | 4.7 | 6.89 | 5.89 |
| Polyol E* | 100 | 100 | | | | |
| Polyol F* | | | 100 | 100 | | |
| Polyol K* | | | | | 100 | |
| Polyol G* | | | | | | 100 |

TABLE 1B-continued

Hydroxyl-Terminated Prepolymers (HTP) 7-12

| HTP Example | 7 | 8 | 9 | 10 | 11 | 12 |
|---|---|---|---|---|---|---|
| Catalyst A* | 0.1 | 0.1 | 0.1 | 0.1 | 0.1 | 0.1 |
| Theo. OH # (mg KOH/g polyol) | 129 | 166 | 100 | 88 | 126 | 108 |
| OH:NCO Molar Ratio | 5.46:1 | 16.84:1 | 11.25:1 | 5.47:1 | 5.45:1 | 5.45:1 |
| Viscosity (mPa·s @ 25° C.) | 2225 | 472 | 615 | 1657 | 4772 | 1718 |

*pbw

TABLE 1C

Hydroxyl-Terminated Prepolymers 13-16

| HTP Example | 13 | 14 | 15 | 16 |
|---|---|---|---|---|
| Polyol E* | 100 | 100 | 100 | 100 |
| Isocyanate C* | 7.3 | | | |
| Isocyanate D* | | 7.13 | | |
| Isocyanate E* | | | 7.17 | |
| Isocyanate F* | | | | 7.3 |
| Catalyst A* | 0.1 | 0.1 | 0.1 | 0.1 |
| Theo. OH # (mg KOH/g polyol) | 128.2 | 128.3 | 128.3 | 128.2 |
| OH:NCO Molar Ratio | 5:46:1 | 5.46:1 | 5.46:1 | 5.46:1 |
| Viscosity (mPa·s @ 25° C.) | 3107 | 2324 | 2405 | 2977 |

*pbw

The free-rise bench scale foams of Table 2 were prepared using the following procedure. The polyols, water, silicone surfactants, amine catalysts, and any other non-isocyanate additives were added to a cylindrical container fitted with baffles. The contents were mixed at 2400 rpm for 60 seconds with an agitator having two turbine impellers. Tin Catalyst C was added at this time. The mixture was then degassed for 15 seconds. After degassing, the contents were mixed at 2400 rpm for 15 seconds, during which period the isocyanate was added when about 10 seconds of mixing time remained. The mixture was then poured into a 14×14×6-inch cardboard box, where it rose freely until the reaction was complete. A batch size sufficient to give a bun at least about 6 inches high was employed. The freshly prepared bun was cured for 20 minutes in an oven at 120° C. and then allowed to cure at ambient conditions for a minimum of 1 day. Observations made during foaming and curing are set forth in the Tables. The buns were then trimmed to 12×12×4 inches and were roller crushed 3 times to a minimum thickness of about 0.5 inches. These samples were then conditioned for at least 16 hours at standard temperature (~23° C.) and humidity (~50%) before being tested.

TABLE 2A

TDI FOAM FORMULATIONS- Examples 1-6:

| Foam Example | 1 | 2 | 3 | 4 | 5 | 6 |
|---|---|---|---|---|---|---|
| Chemical | pphp | pphp | pphp | pphp | pphp | pphp |
| Polyol A | 83 | 83 | 83 | 83 | 83 | 83 |
| Polyol B | 7 | 7 | 7 | 7 | 7 | 7 |
| HTP 1 | 10 | | | | | |
| HTP 2 | | 10 | | | | |
| HTP 3 | | | 10 | | | |
| HTP 4 | | | | 10 | | |
| HTP 5 | | | | | 10 | |
| HTP 6 | | | | | | 10 |
| Surfactant A | 0.80 | 0.80 | 0.80 | 0.80 | 0.80 | 0.80 |
| Water (distilled) | 1.10 | 1.10 | 1.10 | 1.10 | 1.10 | 1.10 |
| Foam Modifier A | 1.50 | 1.50 | 1.50 | 1.50 | 1.50 | 1.50 |
| Foam Modifier B | 0.60 | 0.60 | 0.60 | 0.60 | 0.60 | 0.60 |
| Catalyst A | 0.58 | 0.58 | 0.58 | 0.58 | 0.58 | 0.58 |
| Catalyst B | 0.07 | 0.07 | 0.07 | 0.07 | 0.07 | 0.07 |
| Catalyst C | 0.03 | 0.03 | 0.03 | 0.03 | 0.03 | 0.03 |
| Isocyanate Side | | | | | | |
| Isocyanate A | 30.2 | 30.04 | 32.78 | 32.06 | 29.97 | 32.06 |
| NCO Index | 100.0 | 100.0 | 100.0 | 100.0 | 100.0 | 100.0 |

TABLE 2B

TDI FOAM FORMULATIONS- Examples 7-12:

| Foam Example | 7 | 8 | 9 | 10 | 11 | 12 |
|---|---|---|---|---|---|---|
| Chemical | pphp | pphp | pphp | pphp | pphp | pphp |
| Polyol A | 83 | 83 | 83 | 83 | 83 | 83 |
| Polyol B | 7 | 7 | 7 | 7 | 7 | 17 |
| HTP 7 | 10 | | | | | |
| HTP 8 | | 10 | | | | |
| HTP 9 | | | 10 | | | |
| HTP 10 | | | | 10 | | |
| HTP 11 | | | | | 10 | |
| HTP 12 | | | | | | 10 |
| Surfactant A | 0.80 | 0.80 | 0.80 | 0.80 | 0.80 | 0.80 |
| Water (distilled) | 1.10 | 1.10 | 1.10 | 1.10 | 1.10 | 1.10 |
| Foam Modifier A | 1.50 | 1.50 | 1.50 | 1.50 | 1.50 | 1.50 |
| Foam Modifier B | 0.60 | 0.60 | 0.60 | 0.60 | 0.60 | 0.60 |
| Catalyst A | 0.58 | 0.58 | 0.58 | 0.58 | 0.58 | 0.58 |
| Catalyst B | 0.07 | 0.07 | 0.07 | 0.07 | 0.07 | 0.07 |
| Catalyst C | 0.03 | 0.03 | 0.03 | 0.03 | 0.03 | 0.03 |
| Isocyanate Side | | | | | | |
| Isocyanate A | 34.12 | 34.53 | 33.68 | 33.49 | 31.27 | 31 |
| NCO Index | 100.0 | 100.0 | 100.0 | 100.0 | 100.0 | 100.0 |

TABLE 2C

TDI FOAM FORMULATIONS - Examples 13-16:

| Foam Example | 13 | 14 | 15 | 16 |
|---|---|---|---|---|
| Chemical | pphp | pphp | pphp | pphp |
| Polyol A | 83 | 83 | 83 | 83 |
| Polyol B | 7 | 7 | 7 | 7 |
| HTP 1 | 10 | | | |
| HTP 2 | | 10 | | |
| HTP 3 | | | 10 | |
| HTP 4 | | | | 10 |
| Surfactant A | 0.80 | 0.80 | 0.80 | 0.80 |
| Water (distilled) | 1.10 | 1.10 | 1.10 | 1.10 |
| Foam Modifier A | 1.50 | 1.50 | 1.50 | 1.50 |
| Foam Modifier B | 0.60 | 0.60 | 0.60 | 0.60 |
| Catalyst A | 0.58 | 0.58 | 0.58 | 0.58 |
| Catalyst B | 0.07 | 0.07 | 0.07 | 0.07 |
| Catalyst C | 0.03 | 0.03 | 0.03 | 0.03 |
| Isocyanate Side | | | | |
| Isocyanate A | 31.31 | 31.31 | 31.31 | 31.31 |
| NCO Index | 100.0 | 100.0 | 100.0 | 100.0 |

TABLE 3A

TDI FOAM - MECHANICAL PROPERTIES

| Foam Example | Units | 1 | 2 | 3 | 4 | 5 | 6 |
|---|---|---|---|---|---|---|---|
| Actual Density | kg/m$^3$ | 59.91 | 62.31 | 61.83 | 61.51 | 61.99 | 59.91 |
| | (lb/ft$^3$) | (3.74) | (3.89) | (3.86) | (3.84) | (3.87) | (3.74) |
| Airflow | m$^3$/min | 0.121 | 0.128 | 0.130 | 0.132 | 0.120 | 0.137 |
| | (ft$^3$/min) | (4.29) | (4.53) | (4.61) | (4.66) | (4.25) | (4.85) |
| IFD 25% | N (lbf) | 23.31 | 20.50 | 52.35 | 51.95 | 25.71 | 47.59 |
| | | (5.24) | (4.61) | (11.77) | (11.68) | (5.78) | (10.70) |
| IFD 65% | N (lbf) | 61.16 | 57.96 | 114.09 | 114.00 | 65.83 | 106.53 |
| | | (13.75) | (13.03) | (25.65) | (25.63) | (14.80) | (23.95) |
| IFD 25% Return | N (lbf) | 20.42 | 17.97 | 49.02 | 48.53 | 22.95 | 44.52 |
| | | (4.59) | (4.04) | (11.02) | (10.91) | (5.16) | (10.01) |
| Return Val. 25% | % | 87.7 | 87.7 | 93.6 | 93.4 | 89.4 | 93.5 |
| S.F. 65%/25% | NA | 2.63 | 2.83 | 2.18 | 2.20 | 2.56 | 2.24 |
| Tensile Strength | kPa (psi) | 45.71 | 18.96 | 67.09 | 73.22 | 39.85 | 71.12 |
| | | (6.63) | (2.75) | (9.73) | (10.62) | (5.78) | (10.32) |
| Elongation | % | 224.9 | 137.5 | 200.0 | 214.1 | 197.1 | 215.6 |
| Tear Strength | N/m (pli) | 171.60 | 105.06 | 208.37 | 213.62 | 176.85 | 220.06 |
| | | (0.98) | (0.60) | (1.19) | (1.22) | (1.01) | (1.26) |
| 90% Comp Set | % | 44.1 | 51.6 | 1.3 | 1.0 | 2.3 | 1.4 |
| Resilience (Ball Rebound) | % | 3.7 | 10.1 | 5.0 | 6.0 | 8.5 | 4.5 |
| 90% Wet Set | % | 2.6 | 0.4 | 0.3 | 0.1 | 0.9 | 0.3 |
| Tan (δ) | T$_g$ (° C.) | 10 | 12 | | −61*, 16 | | |
| E' Ratio | 15° C./30° C. | 1.94 | 1.97 | | 3.54 | | |

* 2$^{nd}$ peak observed at −61° C.

TABLE 3B

TDI FOAM - MECHANICAL PROPERTIES

| Example | Units | 7 | 8 | 9 | 10 | 11 | 12 |
|---|---|---|---|---|---|---|---|
| Actual Density | kg/m$^3$ | 59.91 | 60.87 | 60.07 | 60.07 | 61.03 | 59.27 |
| | (lb/ft$^3$) | (3.74) | (3.80) | (3.75) | (3.75) | (3.81) | (3.7) |
| Airflow | m$^3$/min | 0.135 | 0.138 | 0.135 | 0.126 | 0.108 | 0.167 |
| | (ft$^3$/min) | (4.78) | (4.86) | (4.77) | (4.47) | (3.82) | (5.9) |
| IFD 25% | N (lbf) | 52.31 | 50.00 | 43.63 | 43.81 | 45.50 | 40.21 |
| | | (11.76) | (11.24) | (9.81) | (9.85) | (10.23) | (9.04) |
| IFD 65% | N (lbf) | 115.07 | 113.16 | 101.24 | 101.86 | 105.64 | 92.25 |
| | | (25.87) | (25.44) | (22.76) | (22.90) | (23.75) | (20.74) |
| IFD 25% Return | N (lbf) | 48.17 | 45.99 | 39.94 | 39.94 | 41.41 | 37.32 |
| | | (10.83) | (10.34) | (8.98) | (8.98) | (9.31) | (8.39) |
| Return Val. 25% | % | 92.1 | 92.0 | 91.5 | 91.1 | 91.0 | 92.8 |
| S.F. 65%/25% | NA | 2.20 | 2.26 | 2.32 | 2.32 | 2.32 | 2.29 |
| Tensile Strength | kPa (psi) | 96.80 | 87.50 | 84.81 | 85.29 | 61.16 | 74.12 |
| | | (14.04) | (12.69) | (12.30) | (12.37) | (8.87) | (10.75) |
| Elongation | % | 227.8 | 227.3 | 240.4 | 237.5 | 205.6 | 251.5 |
| Tear Strength | N/m (ph) | 248.64 | 243.39 | 245.14 | 243.39 | 196.11 | 204.87 |
| | | (1.42) | (1.39) | (1.40) | (1.39) | (1.12) | (1.17) |
| 90% Comp Set | % | 0.5 | 0.8 | 0.9 | 1.2 | 1.8 | 1.67 |
| Resilience (Ball Rebound) | % | 0.0 | 0.0 | 0.0 | 0.0 | 0.6 | 5 |
| 90% Wet Set | % | 0.4 | 0.3 | 0.6 | 0.1 | 0.6 | 0.12 |
| Tan (δ) | T$_g$ (° C.) | −60*, 12 | | | −57*, 9 | 11 | −60*, 11 |
| E' Ratio | 15° C./30° C. | 2.5 | | | 2.36 | 2.54 | 3.09 |

* 2$^{nd}$ peak observed at −60° C. in Example 7, at −57° C. in Example 10, and at −60° C. in Example 12

TABLE 3C

TDI FOAM - MECHANICAL PROPERTIES

| Example | Units | 13 | 14 | 15 | 16 |
|---|---|---|---|---|---|
| Actual Density | kg/m$^3$ | 59.43 | 60.07 | 60.71 | 60.87 |
| | (lb/ft$^3$) | (3.71) | (3.75) | (3.79) | (3.80) |
| Airflow | m$^3$/min | 0.118 | 0.123 | 0.120 | 0.120 |
| | (ft$^3$/min) | (4.18) | (4.35) | (4.25) | (4.25) |
| IFD 25% | N (lbf) | 53.78 | 51.06 | 54.98 | 54.13 |
| | | (12.09) | (11.48) | (12.36) | (12.17) |
| IFD 65% | N (lbf) | 118.85 | 114.36 | 124.19 | 121.79 |
| | | (26.72) | (25.71) | (27.92) | (27.38) |

TABLE 3C-continued

TDI FOAM - MECHANICAL PROPERTIES

| Example | Units | 13 | 14 | 15 | 16 |
|---|---|---|---|---|---|
| IFD 25% Return | N (lbf) | 49.42 | 46.97 | 50.71 | 50.00 |
|  |  | (11.11) | (10.56) | (11.40) | (11.24) |
| Return Val. 25% | % | 91.85 | 91.99 | 92.23 | 92.32 |
| S.F. 65%/25% | NA | 2.21 | 2.24 | 2.26 | 2.25 |
| Tensile Strength | kPa (psi) | 64.12 | 66.74 | 63.57 | 73.71 |
|  |  | (9.30) | (9.68) | (9.22) | (10.69) |
| Elongation | % | 206.7 | 220.3 | 203.2 | 228.2 |
| Tear Strength | N/m (pli) | 192.61 | 190.08 | 196.11 | 196.11 |
|  |  | (1.1) | (1.09) | (1.12) | (1.12) |
| 90% Comp Set | % | 1.93 | 2.33 | 1.73 | 2.13 |
| Resilience (Ball Rebound) | % | 2.70 | 2.00 | 2.50 | 2.90 |
| 90% Wet Set | % | 4.42 | 4.54 | 4.50 | 4.56 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a viscoelastic flexible polyurethane foam comprising reacting:

(1) a diisocyanate and/or a polyisocyanate component, with (2) an isocyanate-reactive component comprising:
  (a) from 20 to 100% by weight, based on 100% by weight of components (2)(a) and (2)(b), of a polyol blend having a hydroxyl number of from 56 mg KOH/g polyol to about 250 mg KOH/g polyol, an average functionality of greater than 2, and comprising:
    (i) a monofunctional polyether having a hydroxyl number of less than or equal to 56 mg KOH/g polyol, and containing less than or equal to 20% of copolymerized oxyethylene, based on the total weight of the monofunctional polyether (a)(i);
    (ii) a polyether polyol having a hydroxyl number of from 47 mg KOH/g polyol to 300 mg KOH/g polyol, a nominal functionality of 2, and containing from 5 to 45% of copolymerized oxyethylene, based on the total weight of said polyether polyol (a)(ii);
    and
    (iii) a polyether polyol having a hydroxyl number of from 47 mg KOH/g polyol to 300 mg KOH/g polyol, a nominal functionality of greater than 2 to 8, and containing from 5 to 45% of copolymerized oxyethylene, based on the total weight of said polyether polyol (a)(iii);
  wherein (a) said polyol blend comprises 20 to 50% by weight of (i) said monofunctional polyether and the balance comprises components (ii) and (iii) in which from 10 to 90% by weight of the balance comprises component (ii) and from 90 to 10% by weight of the balance comprises component (iii);

and, optionally,
  (b) up to 80% by weight, based on 100% by weight of components (2)(a) and (2)(b), of a polyether polyol having an average functionality of from 2 to 8, a hydroxyl number of from 20 mg KOH/g polyol to 300 mg KOH/g polyol and containing at least 50% of copolymerized oxyethylene, based on the total weight of said polyether polyol (2)(b);

and (3) a hydroxyl-terminated prepolymer comprising the reaction product of:
  (a) a diisocyanate and/or a polyisocyanate component, with
  (b) an isocyanate-reactive component comprising:
    (i) a polyether polyol having a nominal functionality of about 3, and a hydroxyl number ranging from 100 to 200,
    or
    (ii) castor oil,
    wherein the equivalent ratio of (3)(b) said isocyanate-reactive component to (3)(a) said diisocyanate and/or polyisocyanate component (a) ranges from 5:1 to 10:1;

in the presence of (4) a blowing agent;

(5) a catalyst;

and (6) a surfactant.

2. The process of claim 1, wherein (3) said hydroxyl-terminated prepolymer comprises the reaction product of:
(a) a diisocyanate and/or a polyisocyanate component, with
(b) an isocyanate-reactive component comprising:
  (i) a polyether polyol having a nominal functionality of about 3, and a hydroxyl number ranging from 100 to 200,
and the resultant hydroxyl-terminated prepolymer has a viscosity of less than 2500 mPa·s@25° C.

3. The process of claim 2, wherein said hydroxyl-terminated prepolymer has a viscosity of less than 2000 mPa·s@25° C.

4. The process of claim 1, wherein said hydroxyl-terminated prepolymer is prepared at an equivalent ratio of (3)(b) the isocyanate-reactive component to (3)(a) the diisocyanate and/or polyisocyanate component in the range from 5:1 to 6:1.

5. The process of claim 1, wherein (3)(a) said polyisocyanate component comprises a polymeric diphenylmethane diisocyanate having a monomeric MDI content of greater than 45% by weight.

6. The process of claim 5, wherein said polymeric diphenylmethane diisocyanate has a monomeric MDI content of at least 60% by weight.

7. The process of claim 1, wherein (3)(b)(i) said polyether polyol comprises the reaction product of a starter compound with propylene oxide in the presence of a catalyst.

8. The process of claim 1, wherein (3)(b)(i) said polyether polyol comprises the reaction product of a starter compound with an alkylene oxide in the presence of a catalyst, wherein said alkylene oxide comprises a mixture of ethylene oxide and propylene oxide in a weight ratio of greater than 0:100 to 50:50.

9. The process of claim 1, wherein (2)(a) said polyol blend has a hydroxyl number of from 70 mg KOH/g polyol to less than 120 mg KOH/g polyol and an average functionality of at least 2.1.

10. The process of claim 1, wherein the resultant viscoelastic flexible polyurethane foam has a 90% compression set of about 10% or less and a 25% IFD value of at least 9 lbf, as measured by ASTM D-574-11.

11. The process of claim 10, wherein the resultant viscoelastic flexible polyurethane foam additionally has a ratio of storage modulus at 15° C. to the storage modulus at 30° C. of less than or equal to 5 and a $T_g$ of less than 20° C. as measured by tan delta.

12. The process of claim 1, wherein (2) said isocyanate-reactive component additionally comprises at least one of:

(c) a polyether polyol having an hydroxyl number of from 10 mg KOH/g polyol to 300 mg KOH/g polyol, an average functionality of from 2 to 8, and which contains from 0 to 45% by weight of copolymerized oxyethylene, based on 100% by weight of component (2)(c), wherein polyether polyol (2)(c) is different than polyether polyols (2)(a)(ii) and (2)(a)(iii);

and/or (d) a filled polyol.

13. The process of claim 1, wherein (2)(a) said polyol blend comprises an in-situ formed polyol blend.

14. A viscoelastic flexible polyurethane foam comprising the reaction product of:

(1) a diisocyanate or polyisocyanate component, (2) an isocyanate-reactive component comprising:

(a) from 20 to 100% by weight, based on 100% by weight of components (2)(a) and (2)(b), of a polyol blend having a hydroxyl number of from 56 mg KOH/g polyol to about 250 mg KOH/g polyol, an average functionality of greater than 2, and comprising:

(i) a monofunctional polyether having a hydroxyl number of less than or equal to 56 mg KOH/g polyol, and containing less than or equal to 20% of copolymerized oxyethylene, based on the total weight of said monofunctional polyether (a)(i);

(ii) a polyether polyol having a hydroxyl number of from 47 mg KOH/g polyol to 300 mg KOH/g polyol, a nominal functionality of 2, and containing from 5 to 45% of copolymerized oxyethylene, based on the total weight of said polyether polyol (a)(ii);

and (iii) a polyether polyol having a hydroxyl number of from 47 mg KOH/g polyol to 300 mg KOH/g polyol, a nominal functionality of greater than 2 to 8, and containing from 5 to 45% of copolymerized oxyethylene, based on the total weight of said polyether polyol (a)(iii);

wherein (2)(a) said polyol blend comprises 20 to 50% by weight of (i) said monofunctional polyether and the balance comprises components (ii) and (iii) in which from 10 to 90% by weight of the balance comprises component (ii) and from 90 to 10% by weight of the balance comprises component (iii);

and, optionally, (b) up to 80% by weight, based on 100% by weight of components (2)(a) and (2)(b), of a polyether polyol having an average functionality of from 2 to 8, a hydroxyl number of from 20 mg KOH/g polyol to 300 mg KOH/g polyol and containing at least 50% of copolymerized oxyethylene, based on the total weight of said polyether polyol (2)(b);

and (3) a hydroxyl-terminated prepolymer comprising the reaction product of:

(a) a diisocyanate and/or a polyisocyanate component, with (b) an isocyanate-reactive component comprising:

(i) a polyether polyol having a nominal functionality of about 3, and a hydroxyl number of from 100 to 200, or (ii) castor oil, wherein the equivalent ratio of (3)(b) said isocyanate-reactive component to (3)(a) said diisocyanate and/or polyisocyanate component (a) ranges from 5:1 to 10:1;

in the presence of (4) a blowing agent;

(5) a catalyst;

and (6) a surfactant.

15. The viscoelastic flexible polyurethane foam of claim 14, wherein (3) said hydroxyl-terminated prepolymer comprises the reaction product of:

(a) a diisocyanate and/or a polyisocyanate component, with (b) an isocyanate-reactive component comprising:

(i) a polyether polyol having a nominal functionality of about 3, and a hydroxyl number ranging from 100 to 200, and the resultant hydroxyl-terminated prepolymer has a viscosity of less than 2500 mPa·s@25° C.

16. The viscoelastic flexible polyurethane foam of claim 14, wherein said hydroxyl-terminated prepolymer has a viscosity of less than 2000 mPa·s@25° C.

17. The viscoelastic flexible polyurethane foam of claim 14, wherein said hydroxyl-terminated prepolymer is prepared at an equivalent ratio of (3)(b) the isocyanate-reactive component to (3)(a) the diisocyanate and/or polyisocyanate component in the range from 5:1 to 6:1.

18. The viscoelastic flexible polyurethane foam of claim 14, wherein (3)(a) said polyisocyanate component comprises a polymeric diphenylmethane diisocyanate having a monomeric MDI content of greater than 45% by weight.

19. The viscoelastic flexible polyurethane foam of claim 18, wherein (3)(a) said polymeric diphenylmethane diisocyanate has a monomeric MDI content of at least 60% by weight.

20. The viscoelastic flexible polyurethane foam of claim 14, wherein (3)(b)(i) said polyether polyol comprises the reaction product of a starter compound with propylene oxide in the presence of a catalyst.

21. The viscoelastic flexible polyurethane foam of claim 14, wherein (3)(b)(i) said polyether polyol comprises the reaction product of a starter compound with an alkylene oxide in the presence of a catalyst, wherein said alkylene oxide comprises a mixture of ethylene oxide and propylene oxide in a weight ratio of greater than 0:100 to 50:50.

22. The viscoelastic flexible polyurethane foam of claim 14, wherein (2)(a) said polyol blend has a hydroxyl number of from 70 mg KOH/g polyol to less than 120 mg KOH/g polyol and an average functionality of at least 2.1.

23. The viscoelastic flexible polyurethane foam of claim 14, wherein the resultant viscoelastic flexible polyurethane foam has a 90% compression set of about 10% or less and a 25% IFD value of at least 9 lbf, as measured by ASTM D-574-11.

24. The viscoelastic flexible polyurethane foam of claim 23, wherein the resultant viscoelastic flexible polyurethane foam additionally has a ratio of storage modulus at 15° C. to the storage modulus at 30° C. of less than or equal to 5 and a $T_g$ of less than 20° C. as measured by tan delta.

25. The viscoelastic flexible polyurethane foam of claim 14, wherein (2) said isocyanate-reactive component additionally comprises at least one of:

(c) a polyether polyol having an hydroxyl number of from 10 mg KOH/g polyol to 300 mg KOH/g polyol, an average functionality of from 2 to 8, and which contains from 0 to 45% by weight of copolymerized oxyethylene, based on 100% by weight of component (2)(c), wherein polyether polyol (2)(c) is different than polyether polyols (2)(a)(ii) and (2)(a)(iii);

and/or (d) a filled polyol.

26. The viscoelastic flexible polyurethane foam of claim 14, wherein (2)(a) said polyol blend comprises an in-situ formed polyol blend.

* * * * *